US011225230B2

(12) United States Patent
Tajima et al.

(10) Patent No.: US 11,225,230 B2
(45) Date of Patent: Jan. 18, 2022

(54) RECOGNITION-ERROR DETECTOR AND ELECTRIC-BRAKE CONTROLLER

(71) Applicant: TOYOTA JIDOSHA KABUSHIKI KAISHA, Toyota (JP)

(72) Inventors: Yasuhiro Tajima, Nisshin (JP); Hiroki Mima, Toyota (JP); Akihiro Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 140 days.

(21) Appl. No.: 16/402,379

(22) Filed: May 3, 2019

(65) Prior Publication Data
US 2019/0351884 A1 Nov. 21, 2019

(30) Foreign Application Priority Data
May 17, 2018 (JP) .............................. JP2018-095213

(51) Int. Cl.
*B60T 8/172* (2006.01)
*G01D 3/08* (2006.01)
(Continued)

(52) U.S. Cl.
CPC .............. *B60T 8/172* (2013.01); *B60T 8/171* (2013.01); *F16D 55/225* (2013.01); *F16D 65/18* (2013.01); *G01D 3/08* (2013.01); *G01D 5/24461* (2013.01)

(58) Field of Classification Search
CPC .. G01D 3/08; G01D 5/24428; G01D 5/24461; G01D 5/24466; G01D 5/24471;
(Continued)

(56) References Cited

U.S. PATENT DOCUMENTS 4,524,313 A * 6/1985 Kuno ................... G05B 19/231
                                                        318/563
4,575,666 A * 3/1986 Nakashima ............ G01B 7/003
                                                        318/602
(Continued)

FOREIGN PATENT DOCUMENTS

CN        107269834 A       10/2017
JP        04326104 A   *   11/1992
(Continued)

OTHER PUBLICATIONS

Balazovic, Peter, "56F8300 Hybrid controller used in control of electro-mechanical brake", Freescale Semiconductor Application Note AN1999, Rev. 0, Nov. 2004, 48 pages (Year: 2004).*

(Continued)

*Primary Examiner* — David A Testardi
(74) *Attorney, Agent, or Firm* — Sughrue Mion, PLLC

(57) ABSTRACT

An electric-brake controller controls an electric brake operable by an electric motor. The electric-brake controller includes: a rotation-angle obtainer including (i) a relative-rotation-angle obtaining unit that obtains a relative rotation angle of the electric motor for a set time, based on values output and received from a rotation-angle sensor at intervals of the set time, and (ii) an absolute-rotation-angle obtaining unit that calculates the obtained relative rotation angle with consideration of an orientation of the relative rotation angle to obtain an absolute rotation angle that is a rotation angle of the electric motor from a start of its operation; a recognition-error detector that detects a recognition error in the rotation-angle obtainer based on the obtained absolute rotation angle or a changing state of the absolute rotation angle; and a motor controller that controls the electric motor based on a result of detection performed by the recognition-error detector.

12 Claims, 14 Drawing Sheets

(51) Int. Cl.
*F16D 55/225* (2006.01)
*F16D 65/18* (2006.01)
*B60T 8/171* (2006.01)
*G01D 5/244* (2006.01)

(58) Field of Classification Search
CPC ............ G01D 5/24495; G01D 5/2454; G01D 5/2497; B60T 8/171; B60T 8/172; B60T 8/173; B60T 17/22; B60T 17/221; B60T 13/74; B60T 13/741; B62D 5/049; B62D 15/021; F16D 55/225; F16D 65/18
See application file for complete search history.

(56) References Cited

U.S. PATENT DOCUMENTS

| | | | | |
|---|---|---|---|---|
| 6,000,507 | A * | 12/1999 | Bohm | B60T 13/741 188/1.11 E |
| 6,058,358 | A * | 5/2000 | Streichert | G01D 3/08 702/151 |
| 6,279,694 | B1 * | 8/2001 | Bohm | B60T 13/74 188/1.11 E |
| 6,424,928 | B1 * | 7/2002 | Elliott | G01D 3/08 702/113 |
| 2005/0068023 | A1 * | 3/2005 | Walter | G01D 5/24461 324/207.25 |
| 2008/0157705 | A1 * | 7/2008 | Sasaki | G01D 5/24461 318/564 |
| 2011/0025312 | A1 * | 2/2011 | Nagano | G01D 5/2497 324/207.25 |
| 2012/0068694 | A1 * | 3/2012 | Mitamura | G01D 5/145 324/207.25 |
| 2013/0335138 | A1 * | 12/2013 | Kawamura | H03K 5/1252 327/551 |
| 2014/0262634 | A1 | 9/2014 | Yamasaki et al. | |
| 2014/0289571 | A1 * | 9/2014 | Niwa | H03M 1/08 714/47.2 |
| 2015/0130931 | A1 * | 5/2015 | Shigeta | G01D 5/34792 348/135 |
| 2015/0219473 | A1 * | 8/2015 | Morawek | G01D 5/142 702/151 |
| 2015/0367887 | A1 * | 12/2015 | Fujita | B62D 15/021 701/41 |
| 2016/0288823 | A1 * | 10/2016 | Mikamo | B62D 5/049 |
| 2017/0217409 | A1 | 8/2017 | Masuda | |
| 2017/0292605 | A1 | 10/2017 | Hamaya et al. | |
| 2017/0344417 | A1 * | 11/2017 | Kobayashi | G01D 5/24495 |
| 2018/0009426 | A1 | 1/2018 | Masuda | |
| 2019/0023243 | A1 * | 1/2019 | Mastrocola | B60T 8/171 |
| 2019/0023244 | A1 * | 1/2019 | Mastrocola | B60T 13/741 |
| 2019/0031170 | A1 * | 1/2019 | Mastrocola | B60T 8/171 |
| 2019/0351940 | A1 * | 11/2019 | Kozuka | B62D 5/0481 |

FOREIGN PATENT DOCUMENTS

| | | | | |
|---|---|---|---|---|
| JP | 07270182 | A * | 10/1995 | |
| JP | 2001-99204 | A | 4/2001 | |
| JP | 2013-092207 | A | 5/2013 | |
| JP | 2016-078620 | A | 5/2016 | |
| JP | 2016-182865 | A | 10/2016 | |
| JP | 2018-033228 | A | 3/2018 | |
| JP | 2019199140 | A * | 11/2019 | ........... B62D 5/0463 |

OTHER PUBLICATIONS

Hoseinnezhad, Reza, "Position sensing in brake-by-wire callipers using resolvers", IEEE Transactions on Vehicular Technology, vol. 55, No. 3, May 2006, pp. 924-932. (Year: 2006).*

Wikipedia article, "Resolver (electrical)", Old revision dated Mar. 5, 2018, 3 pages (Year: 2018).*

EPO machine translation of JP 2019-199140 (original JP document published Nov. 21, 2019) (Year: 2019).*

* cited by examiner $180° > \Delta\theta_2 = \theta_{t2} - \theta_{t1}$ $180° < \Delta\theta_3' = \theta_{t3'} - \theta_{t2}$
→ REVERSE ROTATION, $(360° - \Delta\theta_3')$ $0° > \Delta\theta_4' = \theta_{t4} - \theta_{t3'}$
→ $180° < |\Delta\theta_4'|$
→ REVERSE ROTATION, $|\Delta\theta_4'|$ $180° > \Delta\theta_5 = \theta_{t5} - \theta_{t4}$
→ FORWARD ROTATION, $|\Delta\theta_5|$

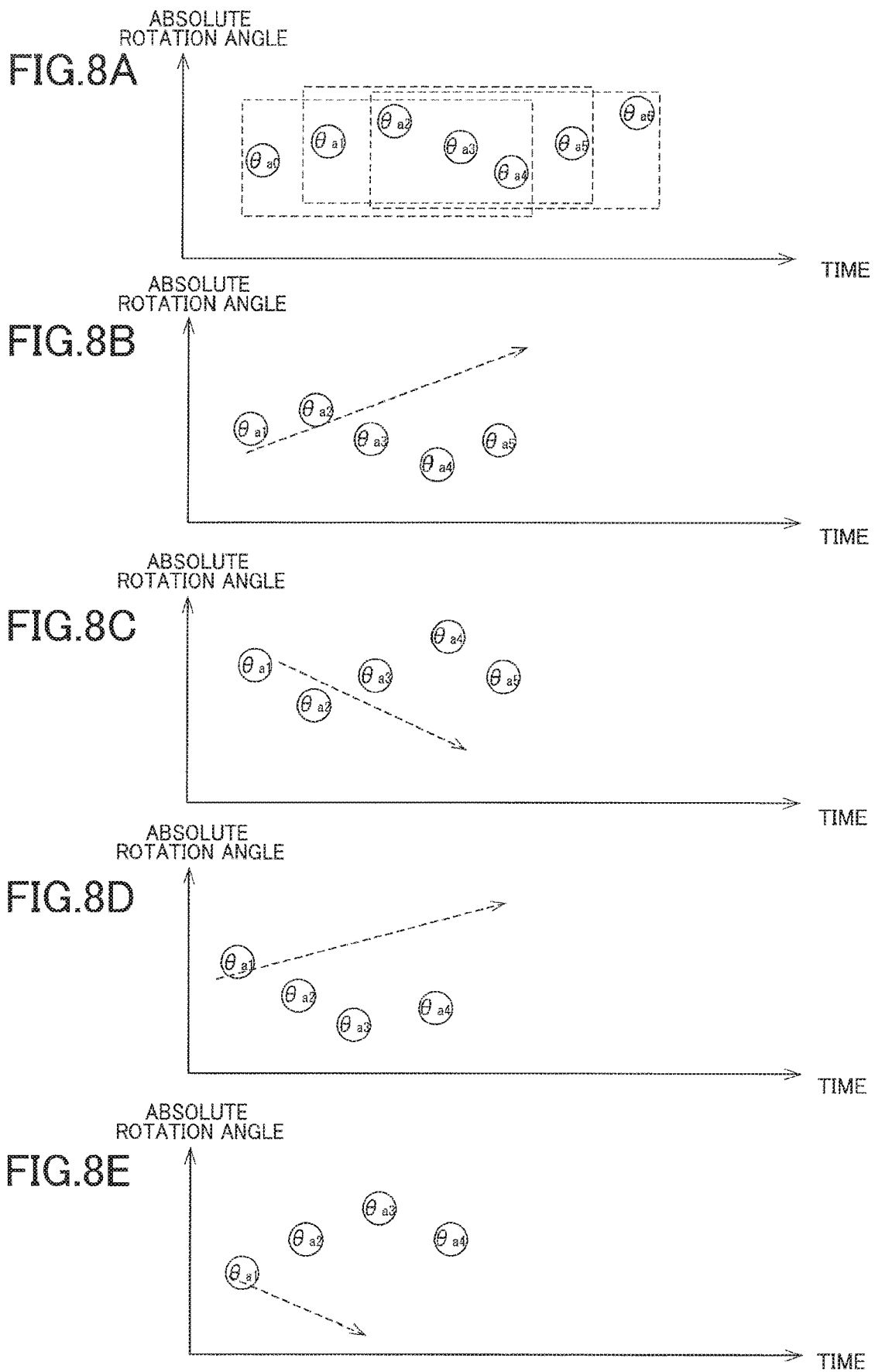

RECOGNITION-ERROR DETECTOR AND ELECTRIC-BRAKE CONTROLLER

CROSS REFERENCE TO RELATED APPLICATION

The present application claims priority from Japanese Patent Application No. 2018-095213, which was filed on May 17, 2018, the disclosure of which is herein incorporated by reference in its entirety.

BACKGROUND

The following disclosure relates to a recognition-error detector configured to detect a recognition error in a rotation-angle obtainer configured to obtain a rotation angle of an electric motor, and to an electric-brake controller configured to control an electric motor to control an electric brake.

Patent Document 1 (Japanese Patent Application Publication No. 2016-78620) discloses an electric-brake controller configured to control an electric motor to bring an actual brake force closer to a target brake force in the case where the target brake force is greater than a set value. In the case where the target brake force is less than or equal to the set value, a target clearance is obtained based on the target brake force, and the electric motor is controlled so as to bring an actual clearance, which is determined based on a rotation angle of the electric motor, closer to the target clearance.

Patent Document 2 (Japanese Patent Application Publication No. 2018-33228) discloses a malfunction detector configured to: obtain rotation angles of an electric motor by means of three systems including a resolver; obtain an average value of the three rotation angles obtained by the three systems; and detect that there is a malfunction in the system having obtained a value that deviates from the average value by greater than or equal to a set value.

SUMMARY

Accordingly, an aspect of the disclosure relates to a recognition-error detector capable of detecting a recognition error in a rotation-angle obtainer and to an electric-brake controller including the recognition-error detector.

In one aspect of the disclosure, a recognition-error detector is configured to detect a recognition error based on a rotation angle obtained by a rotation-angle obtainer and/or on a changing state of the rotation angle, for example. The recognition error refers to a situation in which, in the case where the rotation-angle obtainer includes a data processor configured to obtain an absolute rotation angle by obtaining a relative rotation angle of an electric motor based on values output from a rotation-angle sensor and received and recognized by the data processor, the rotation-angle sensor is normal, but a value received and recognized by the data processor is different from the value output from the rotation-angle sensor, for example. Thus, in the case where the value recognized by the data processor is different from the value output from the rotation-angle sensor, the relative rotation angle (orientation and magnitude) obtained by the data processor is different from an actual relative rotation angle, and the absolute rotation angle obtained by the data processor is different from an actual absolute rotation angle. In view of the above, it is possible to well detect the recognition error in the rotation-angle obtainer based on the absolute rotation angle and the relative rotation angle obtained by the rotation-angle obtainer, and/or changing states of the absolute rotation angle and the relative rotation angle, for example.

In another aspect of the disclosure, an electric-brake controller controls an electric brake by controlling an electric motor based on a position of a pressing member which is determined based on a rotation angle obtained by a rotation-angle obtainer. When a recognition error is detected, the electric-brake controller controls the electric motor based on a position located behind the pressing member. This control avoids backward movement of the pressing member for an excessively long distance even if the accuracy of the position of the pressing member lowers. This makes it difficult for the pressing member to come into contact with another component even without a stopper provided in the electric brake, thereby reducing a malfunction in the electric brake.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIGS. 4A and 4B are front elevational views of a return spring of the electric brake, wherein FIG. 4A illustrates a non-acting state of the return spring, and FIG. 4B illustrates an acting state of the return spring;

FIG. 8A is a view illustrates samples when detecting a recognition error, and FIGS. 8B through 8E illustrate error patterns;

DETAILED DESCRIPTION OF THE EMBODIMENTS

Hereinafter, there will be described a vehicle brake system including an electric-brake controller according to embodiments. The present electric-brake controller includes a recognition-error detector.

First Embodiment

Figure 1:
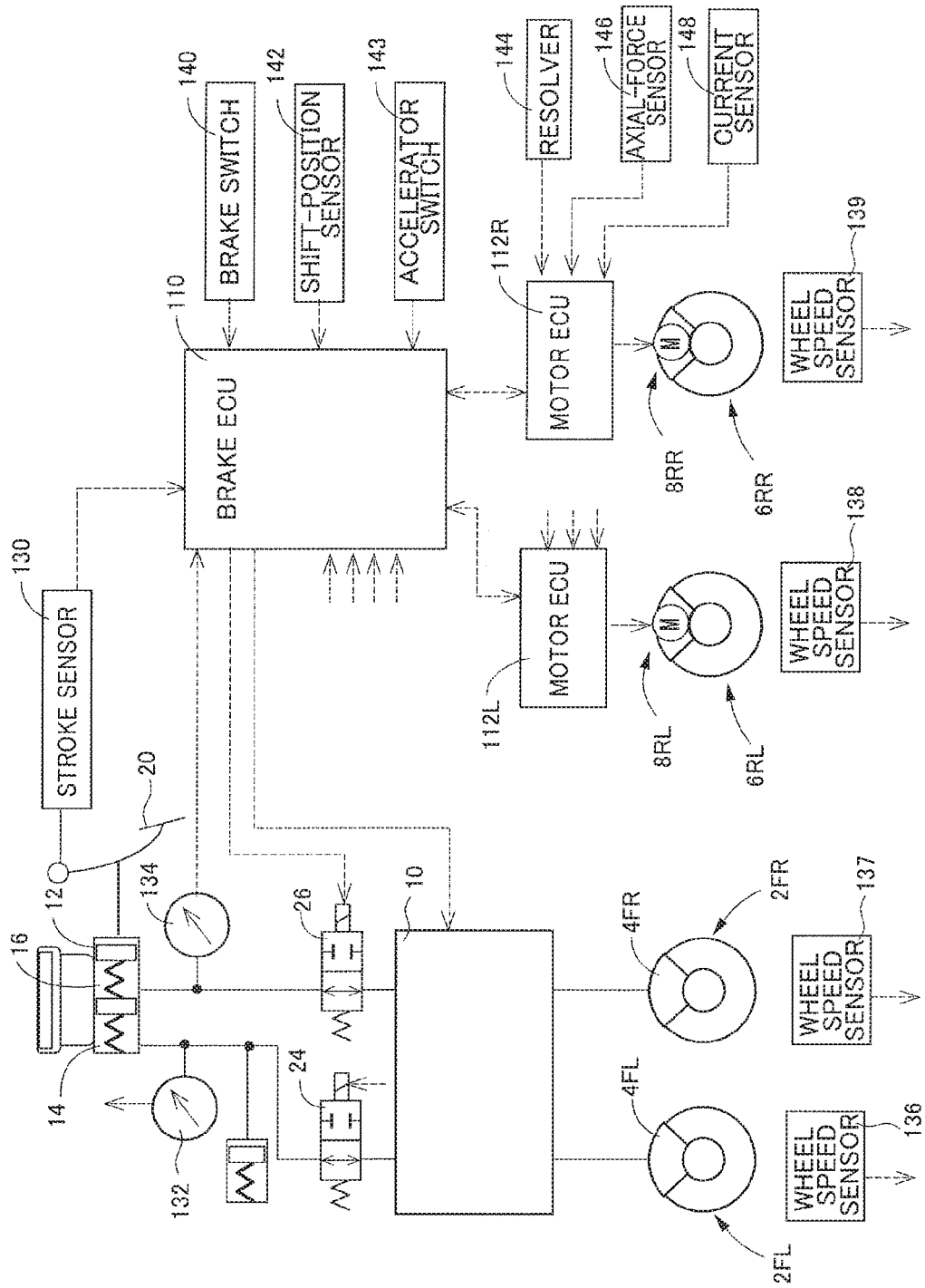
FIG. 1 is a view conceptually illustrating a vehicle brake system including an electric-brake controller according to one embodiment which includes a recognition-error detector according to one embodiment.

As schematically illustrated in FIG. 1, the present vehicle brake system includes: hydraulic brakes 4FL, 4FR provided respectively for front left and right wheels 2FL, 2FR; and electric brakes 8RL, 8RR provided respectively for rear left and right wheels 6RL, 6RR. Each of the hydraulic brakes 4FL, 4FR is actuated by a hydraulic pressure in a corresponding one of wheel cylinders. Each of the electric brakes 8RL, 8RR is actuated by a driving force generated by a corresponding one of electric motors.

Hydraulic-pressure chambers 14, 16 of a master cylinder 12 are connected to the respective wheel cylinders of the hydraulic brakes 4FL, 4FR via a hydraulic-pressure control unit 10. Hydraulic pressures are produced in the respective hydraulic-pressure chambers 14, 16 of the master cylinder 12 in response to depression of a brake pedal 20 as one example of a brake operating member. Master cut-off valves 24, 26 are provided between the master cylinder 12 and the hydraulic-pressure control unit 10. Each of the master cut-off valves 24, 26 is a normally open electromagnetic open/close valve. Hydraulic pressures controlled by the hydraulic-pressure control unit 10 are supplied to the respective wheel cylinders of the hydraulic brakes 4L, 4R to actuate the hydraulic brakes 4L, 4R. As a result, hydraulic braking forces which are braking forces related to the hydraulic pressures in the respective wheel cylinders are applied to the respective front left and right wheels 2FL, 2FR. In the following description, the suffixes (e.g., FL, FR, RL, RR, R, indicative of the positions of the respective wheels may be omitted where these devices are collectively referred, or the distinction is not required, for example.

Figure 2:
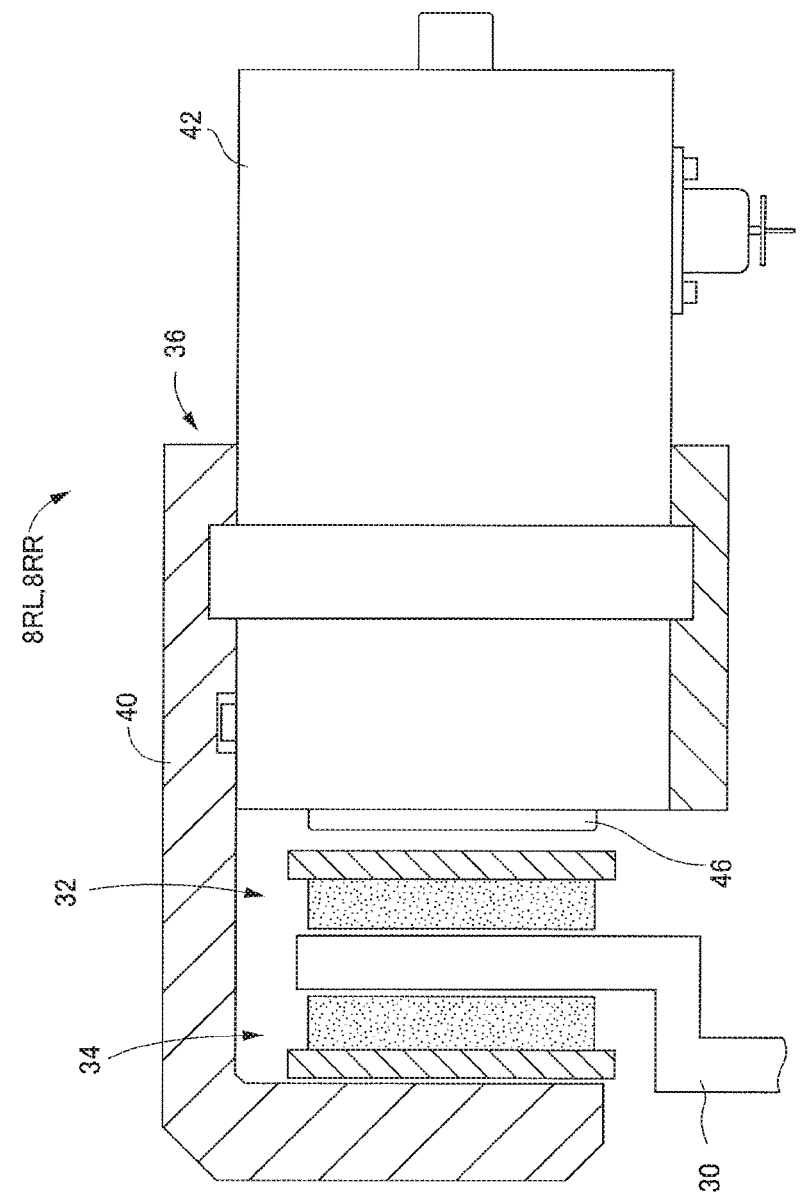
FIG. 2 is a cross-sectional view of an electric brake of the vehicle brake system.

As illustrated in FIG. 2, each of the electric brakes 8 is a disc brake including: a rotor 30 rotatable together with a corresponding one of rear wheels 6; friction pads 32, 34, as a pair of friction members, held by a mounting bracket, not illustrated, and located on opposite sides of the rotor 30; and a pressing device 36. The pressing device 36 includes: a caliper 40 extending over the rotor 30 and held by the mounting bracket so as to be movable in a direction parallel with the rotation axis of the rotor 30; and an electric actuator 42 held by the caliper 40.

Figure 3:
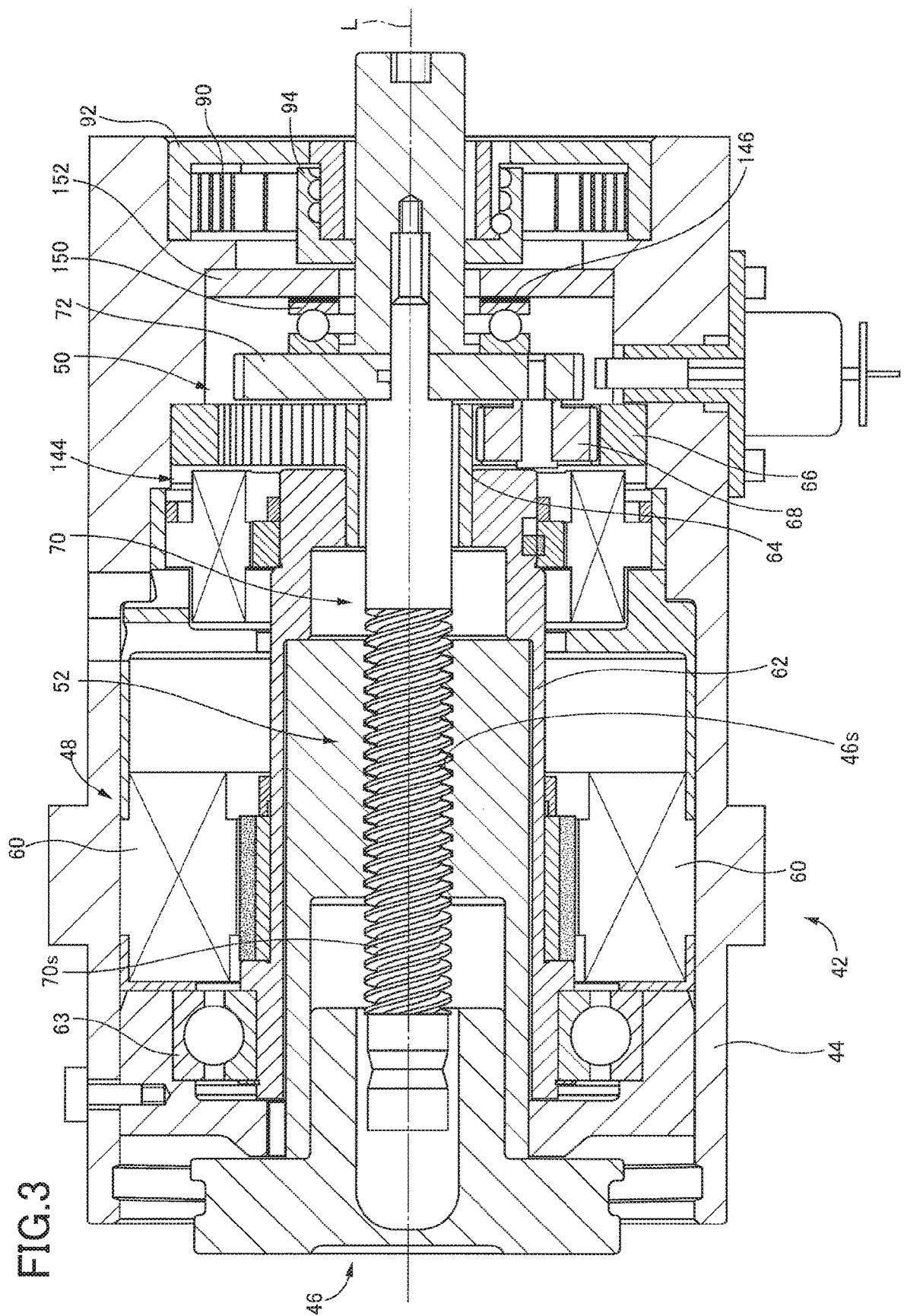
FIG. 3 is a cross-sectional view of a main portion of the electric brake.

As illustrated in FIG. 3, the electric actuator 42 includes: a housing 44; a pressing member 46 held by the housing 44 so as not to be rotatable and so as to be movable in the axial direction of the electric actuator 42 (noted that the sign L indicates the axis of the electric actuator 42 which is parallel with the rotation axis of the rotor 30; a drive source including a electric motor 48 and a speed reducer 50; and a motion transmission mechanism 52 configured to transmit an output of the drive source to the pressing member 46.

The pressing member 46 extends in the axial direction. A front end portion of the pressing member 46 is opposed to the friction pad 32. A central portion of a rear portion of the pressing member 46 has an engagement hole extending in the axial direction. An inner circumferential surface of the engagement hole has a female thread 46s.

The electric motor 48 includes: a plurality of coils 60 constituting a stator; and a rotation drive shaft 62 having a generally hollow cylindrical shape. The rotation drive shaft 62 is held by the housing 44 via a bearing 63 so as to be rotatable about the axis L and so as not to be movable in the axial direction. The rear portion of the pressing member 46 is fitted on an inner circumferential side of the rotation drive shaft 62 so as to be movable in the axial direction and rotatable relative to the rotation drive shaft 62. Rotation of the rotation drive shaft 62 is input to the speed reducer 50.

The speed reducer 50 having a planetary gear includes: a sun gear 64 rotatable together with the rotation drive shaft 62; a ring gear 66 fixed to the housing 44; and a plurality of planetary gears 68 engaged with the sun gear 64 and the ring gear 66 and configured to revolve around the sun gear 64. It is noted that FIG. 3 illustrates one of the planetary gears 68. Each of the planetary gears 68 is coupled to an output shaft 70 of the speed reducer 50. Specifically, a flange 72 is provided on the output shaft 70 so as to be rotatable together, and the planetary gears 68 are mounted on the flange 72 so as to be rotatable on its axis, so that the output shaft 70 is rotated about the axis L with revolving of the planetary gears 68. The rotational speed of the rotation drive shaft 62 is reduced by the speed reducer 50 and output to the output shaft 70, and a rotational driving force of the rotation drive shaft 62 is boosted and output to the output shaft 70. It is noted that the output shaft 70 of the speed reducer 50 (the drive source) is an input shaft of the motion transmission mechanism 52. Thus, the output shaft 70 may be hereinafter referred to as "input shaft 70".

The input shaft 70 extends in the axial direction and is held by the housing 44 so as to be rotatable and so as not to be movable in the axial direction. The flange 72 is formed on a rear portion of the input shaft 70, and an outer circumferential portion of a front portion of the input shaft 70 has a male thread 70s. The front portion of the input shaft 70 is inserted into the engagement hole formed in the rear portion of the pressing member 46, and the male thread 70s and the female thread 46s are engaged with each other. In the present embodiment, components including the male thread 70s of the input shaft 70 and the female thread 46s of the pressing member 46 constitute the motion transmission mechanism 52 as a threaded mechanism. The motion transmission mechanism 52 also functions as a motion converter. It is noted that the female thread 46s and the male thread 70s are as one example of a trapezoid threaded portion.

Rotation of the input shaft 70 is converted to a linear motion and transmitted to the pressing member 46 to move the pressing member 46 in the axial direction. Rotation of the electric motor 48 in the forward direction rotates the input shaft 70 so as to advance the pressing member 46. The pressing member 46 and the caliper 40 press the pair of friction pads 32, 34 against the rotor 30 to reduce rotation of the wheel 6. That is, the electric brake 8 is actuated to apply a motor-generated braking force, which is a braking force related to the pressing force applied to the rotor 30, to the wheel 6. Rotation of the electric motor 48 in the reverse direction rotates the input shaft 70 so as to move the pressing member 46 backward.

Figure 4A:
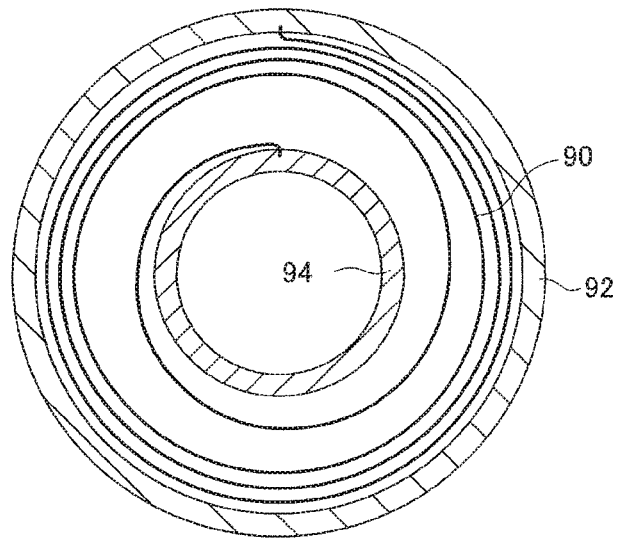
Figure 4B:
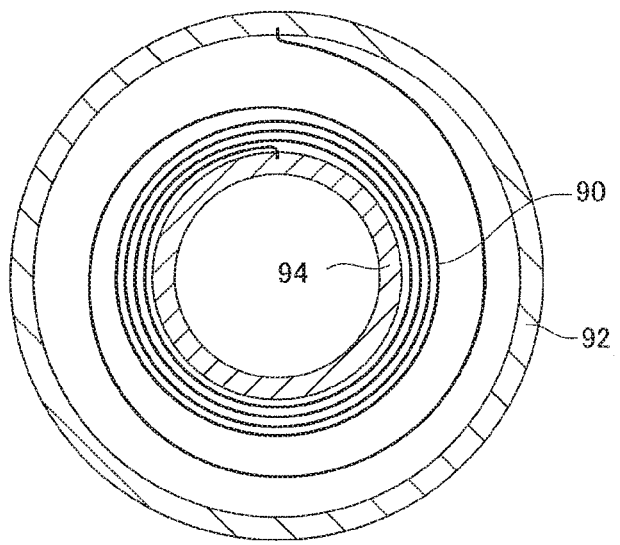

A return spring 90 is provided between the rear portion of the input shaft 70 and the housing 44. The return spring 90 applies, to the input shaft 70, a spring force that is directed to rotate the input shaft 70 so as to move the pressing member 46 backward. This spring force may be hereinafter referred to as "spring force in a backward-movement-causing rotational direction". The return spring 90 is a spiral spring, for example. As illustrated in FIGS. 4A and 4B, the return spring 90 is provided in a state in which a circumferentially outer end portion of the return spring 90 is fixed to a circumferentially outer retainer 92 that is provided on the housing 44 so as not to be rotatable relative to the housing 44, and a circumferentially inner end portion of the return spring 90 is fixed to a circumferentially inner retainer 94 that is provided on the input shaft 70 so as not to be rotatable relative to the input shaft 70. As illustrated in FIG. 4A, the return spring 90 is in a non-acting state when the pressing member 46 is located at its rearmost position. As illustrated in FIG. 4B, the return spring 90 is tightened with rotation of the input shaft 70 which advances the pressing member 46, that is, the return spring 90 is tightened with advance of the pressing member 46. The spring force in the backward-movement-causing rotational direction increases with advance of the pressing member 46.

As described above, since the motion transmission mechanism 52 includes the trapezoid threaded portion, backward efficiency which is efficiency when the input shaft 70 is rotated by backward movement of the pressing member 46 is small when compared with forward efficiency which is efficiency when the pressing member 46 is moved by rotation of the input shaft 70. Thus, even when a backward force is applied to the pressing member 46, it is difficult to rotate the input shaft 70 so as to move the pressing member 46 backward, which may lead to brake drag. In the present embodiment, in contrast, the return spring 90 is provided to apply the spring force in the backward-movement-causing rotational direction to the input shaft 70. With this configuration, when the electric brake 8 is released, it is possible to rotate the input shaft 70 so as to move the pressing member 46 backward, thereby well moving the pressing member 46 back to its rearmost position.

As illustrated in FIG. 1, the present vehicle brake system includes: a brake ECU 110 configured to control the overall vehicle brake system; and motor ECUs 112L, 112R configured to control the respective electric motors 48L, 48R. Each of the brake ECU 110 and the motor ECUs 112L, 112R is principally constituted by a computer and includes an executing section, a storage, and an input/output section, not illustrated. The brake ECU 110 and each of the motor ECUs 112L, 112R are communicable with each other.

Devices connected to the input/output section of the brake ECU 110 include: a stroke sensor 130 configured to detect a stroke of the brake pedal 20; master-cylinder-pressure sensors 132, 134 configured to detect hydraulic pressures in respective pressure chambers 14, 16 formed in the master cylinder 12; wheel speed sensors 136-139 provided in the respective wheels 2FL, 2FR, 6RL, 6RR and configured to detect rotational speeds of the respective wheels; a brake switch 140; a shift-position sensor 142; an accelerator switch 143; the hydraulic-pressure control unit 10; and the master cutoff valves 24, 26. The brake switch 140 outputs an ON signal in a state in which the brake pedal 20 is depressed. The shift-position sensor 142 detects the position of a shift operating member, not illustrated. The accelerator switch 143 outputs an ON signal in a state in which an accelerator pedal, not illustrated, is depressed.

Devices connected to the input/output section of each of the motor ECUs 112L, 112R include: a resolver 144 configured to detect the rotation angle of the electric motor 48; an axial-force sensor 146 configured to detect an axial force that is a force applied to the pressing member 46 in the axial direction; a current sensor 148 configured to detect a current flowing in the coils 60 of the electric motor 48; and a drive circuit, not illustrated, of the electric motor 48. In the present embodiment, the axial-force sensor 146 is configured to detect a reaction force against a pressing force by which the pressing member 46 presses the rotor 30 via the friction pads 32, 34. The axial-force sensor 146 includes a thrust bearing 150 provided between the input shaft 70 and a support plate 152 of the housing 44 and configured to detect a force applied to the support plate 152 in the axial direction. Thus, the axial force detected by the axial-force sensor 146 corresponds to the pressing force.

Figure 5A:
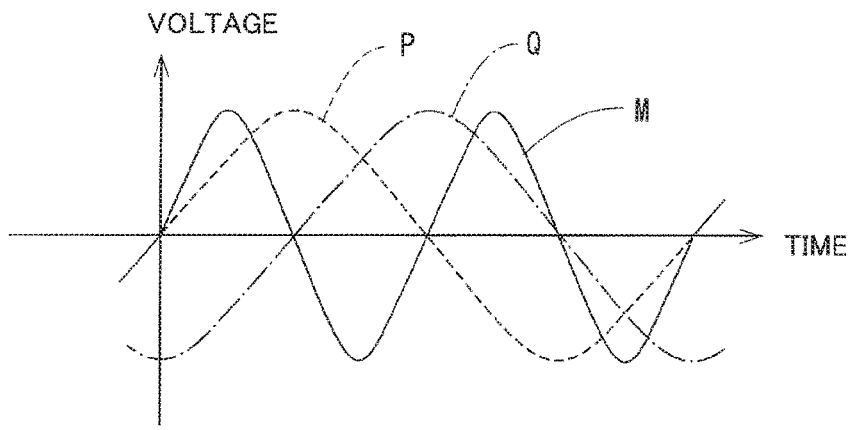
FIG. 5A is a view of alternating signals output from a resolver that detects a rotation angle of an electric motor of the electric brake.
Figure 5B:
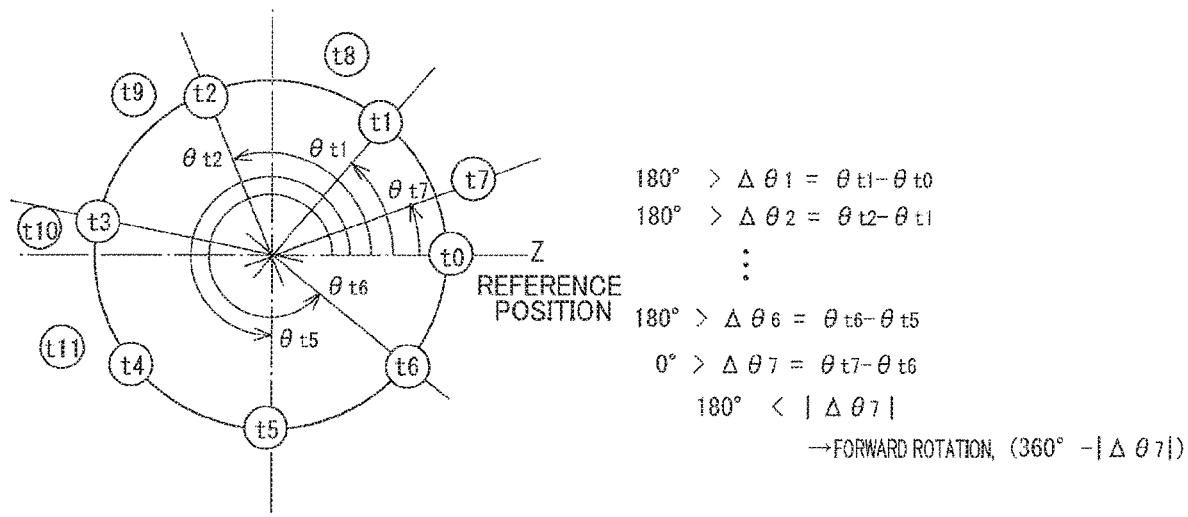
FIG. 5B is a view of signals output from the resolver and relative rotation angles in the case of no recognition error.
Figure 6A:
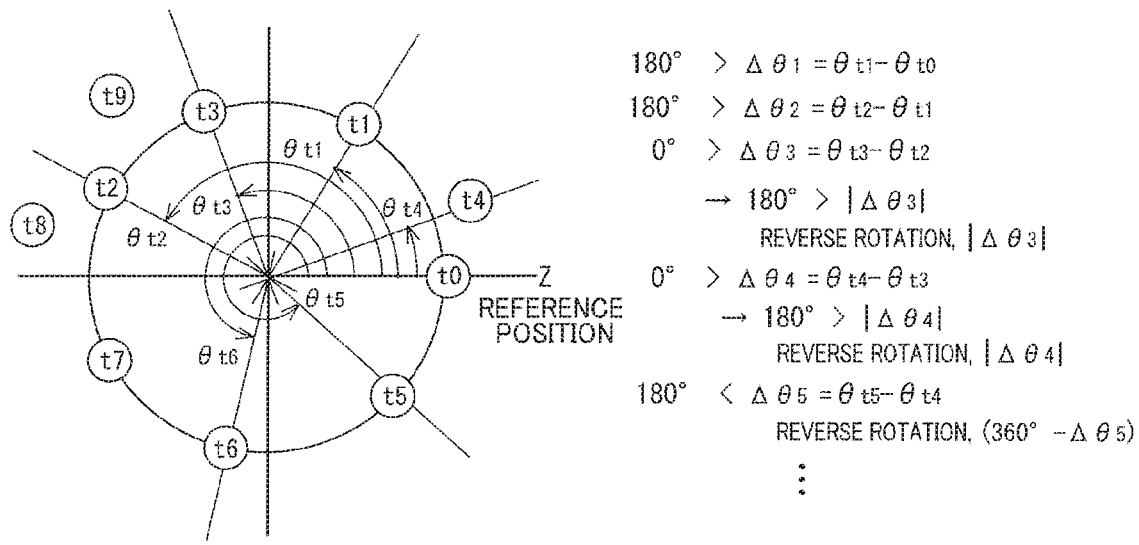
FIG. 6A is a view of signals output from the resolver and relative rotation angles in the case of no recognition error.
Figure 7A:
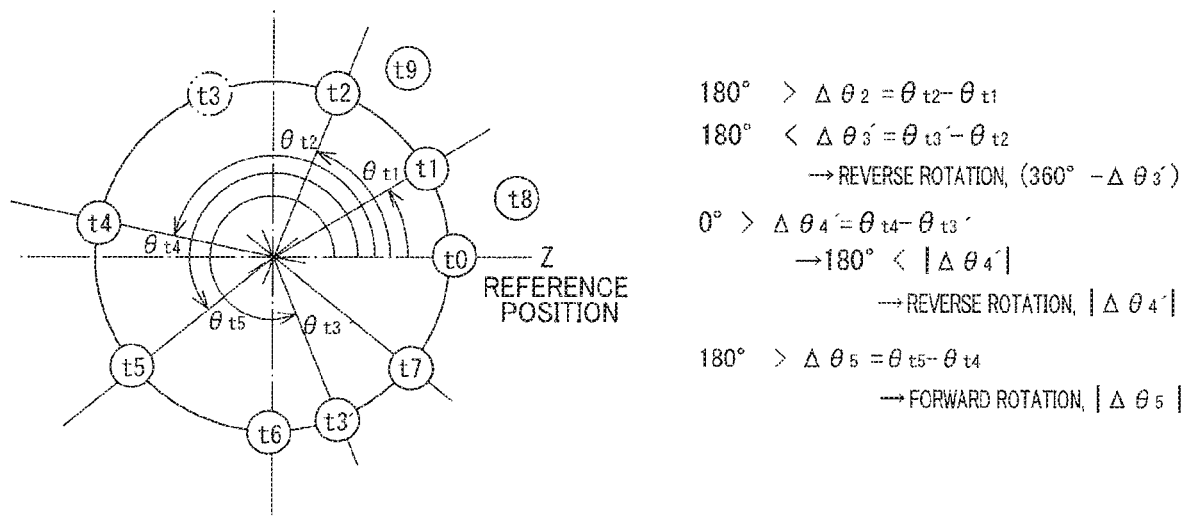
FIG. 7A is a view of signals output from the resolver and relative rotation angles in the event of a recognition error.

The resolver 144 detects and outputs a rotation angle $\theta_{tk}$ (0-360 degrees) that is an angle of the electric motor 48 from a reference position. The reference position, for example, is a position at a predetermined point on the rotation drive shaft 62 and indicated by Z in FIG. 5E. As illustrated in FIG. 5A, the resolver 144 includes a plurality of coils that output alternating signals P, Q, M in each of which a voltage changes with rotation of the electric motor 48. The phases of the respective alternating signals P, Q are different from each other by 90 degrees. The period of the alternating signal M is one-half of that of each of the alternating signals P, Q. The resolver 144 detects an output value $\theta_{tk}$ based on the phases determined by the two alternating signals P, Q and the voltage of the alternating signal M. The output value $\theta_{tk}$ is a rotation angle of the electric motor 48 from the reference position Z. As illustrated in FIGS. 5B, 6A, and 7A, the resolver 144 outputs the output value $\theta_{tk}$ at intervals of a cycle time as one example of a set length of time. It is noted that k is a natural number that represents the ordinal number of the cycle time.

The output value $\theta_{tk}$ output from the resolver 144 is received and recognized by the motor ECU 112. This recognized output value may be hereinafter referred to as "recognized value". The motor ECU 112 obtains a relative rotation angle $\Delta\theta_k$ (orientation and magnitude) based on a value obtained by subtracting the previous value $\theta_{tk-1}$ of the recognized value from the present value $\theta_{tk}$ of the recognized value. The relative rotation angle $\Delta\theta_k$ is a rotation angle of the electric motor 48 for one cycle time. The motor ECU 112 obtains an absolute rotation angle $\theta_{ak}$ by calculating the relative rotation angle $\Delta\theta_k$, i.e., by calculating the relative rotation angle $\Delta\theta_k$ with consideration of the orientation of the relative rotation angle. The absolute rotation angle $\theta_{ak}$ is a rotation angle of the electric motor 48 from the start of operation of the electric motor 48. The orientation of the relative rotation angle in the case where the electric motor 48 is being rotated in the forward direction is a positive orientation. The orientation of the relative rotation angle in the case where the electric motor 48 is being rotated in the reverse direction is a negative orientation. The absolute rotation angle $\theta_{ak}$ of the electric motor 48 from the start of operation corresponds to an amount of advance of the pressing member 46 from the initial position (or a position with respect to the initial position).

It is noted that, in the present embodiment, the magnitude of the relative rotation angle is represented by a positive value regardless of whether the orientation of the relative rotation angle is the positive orientation or the negative orientation. Thus, the absolute rotation angle at this time (the present absolute rotation angle) is obtained by calculating the relative rotation angle with consideration of the orientation of the relative rotation angle. Specifically, in the case where the orientation of the relative rotation angle is the positive orientation, the present absolute rotation angle is obtained by adding the relative rotation angle $\Delta\theta_k$ to the previous absolute rotation angle, and in the case where the orientation of the relative rotation angle is the negative orientation, the present absolute rotation angle is obtained by subtracting the relative rotation angle $\Delta\theta_k$ from the previous absolute rotation angle. In the case where the relative rotation angle is determined to a positive value when the orientation of the relative rotation angle is the positive orientation, and is determined to a negative value when the orientation of the relative rotation angle is the negative orientation, the present absolute rotation angle is obtained by adding the relative rotation angle to the previous absolute rotation angle regardless of whether the orientation of the relative rotation angle is the positive orientation or the negative orientation. In the following description, the wording "obtain the absolute rotation angle by calculating the relative rotation angle with consideration of the orientation of the relative rotation angle" or "obtain the absolute rotation angle by calculating the relative rotation angle" includes the above-described two cases.

Figure 9:
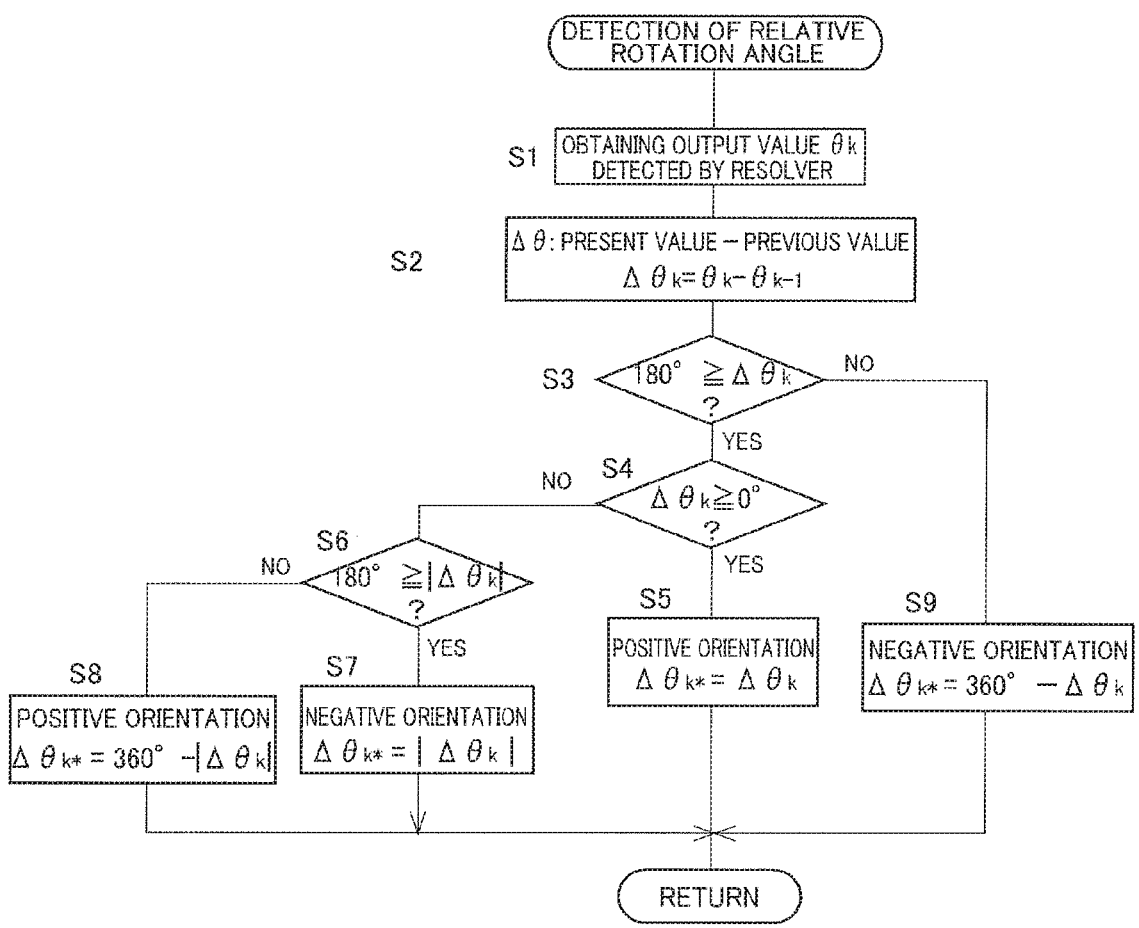
FIG. 9 is a flowchart representing a relative-rotation-angle obtaining program stored in a storage of a motor ECU of the vehicle brake system.

In the present embodiment, each of the motors ECU 112 obtains the relative rotation angle by executing a relative-rotation-angle obtaining program represented by the flowchart in FIG. 9. The relative-rotation-angle obtaining program is executed each time when the motor ECU 112 receives the output value $\theta_{tk}$ detected by the resolver 144. At S1, the motor ECU 112 receives and recognizes the output value $\theta_{tk}$ detected by the resolver 144. At S2, the motor ECU 112 obtains a raw relative rotation angle $\Delta\theta_k$ that is obtained by subtracting the previous output value $\theta_{tk-1}$ from the present output value $\theta_{tk}$. At S3, the motor ECU 112 determines whether the raw relative rotation angle $\theta_{tk}$ is less than or equal to 180 degrees. When a positive decision (YES) is made at S3, the motor ECU 112 at S4 determines whether the raw relative rotation angle $\Delta\theta_k$ is greater than or equal to zero degrees. When a positive decision (YES) is made at S4, the motor ECU 112 at S5 determines that the orientation of the relative rotation angle is the positive orientation (corresponding to rotation of the electric motor 48 in the forward direction) and sets the raw relative rotation angle $\Delta\theta_k$ to a determined relative rotation angle $\Delta\theta_{k*}$. When a negative decision (NO) is made at S3, the motor ECU 112 at S9 determines that the orientation of the relative rotation angle is the negative orientation (corresponding to rotation of the electric motor 48 in the reverse direction) and sets, to a determined relative rotation angle $\Delta\theta_{k*}$, a value obtained by subtracting the raw relative rotation angle $\Delta\theta_k$ from 360 degrees.

When a negative decision (NO) is made at S4, the motor ECU 112 at S6 determines whether an absolute value $|\Delta\theta_k|$ of the raw relative rotation angle $\Delta\theta_k$ is less than or equal to 180 degrees. When a positive decision (YES) is made at S6, the motor ECU 112 at S7 determines that the orientation of the relative rotation angle is the negative orientation and sets the absolute value $|\Delta\theta_k|$ of the raw relative rotation angle $\Delta\theta_k$, to the determined relative rotation angle $\Delta\theta_{k*}$. When a negative decision (NO) is made at S6, the motor ECU 112 at S8 determines that the orientation of the relative rotation angle is the positive orientation and sets, to the determined relative rotation angle $\Delta\theta_{k*}$, a value obtained by subtracting the absolute value $|\Delta\theta_k|$ from 360 degrees.

Thus, in the case where the absolute value $|\Delta\theta_k|$ of the raw relative rotation angle $\Delta\theta_k$ is less than or equal to 180 degrees, the orientation of the determined relative rotation angle $\Delta\theta_{k*}$ is the same as the sign (positive or negative) of the raw relative rotation angle $\Delta\theta_k$, and the motor ECU 112 sets the magnitude of the determined relative rotation angle $\Delta\theta_{k*}$ to the absolute value $|\Delta\theta_k|$. In the case where the absolute value $|\Delta\theta_k|$ of the raw relative rotation angle $\Delta\theta_k$ is greater than 180 degrees, in contrast, the orientation of the determined relative rotation angle $\Delta\theta_{k*}$ is reverse to the sign (positive or negative) of the raw relative rotation angle $\Delta\theta_k$, and the motor ECU 112 sets the magnitude of the determined relative rotation angle $\Delta\theta_{k*}$ to the value obtained by subtracting the absolute value $|\Delta\theta_k|$ from 360 degrees.

Figure 10:
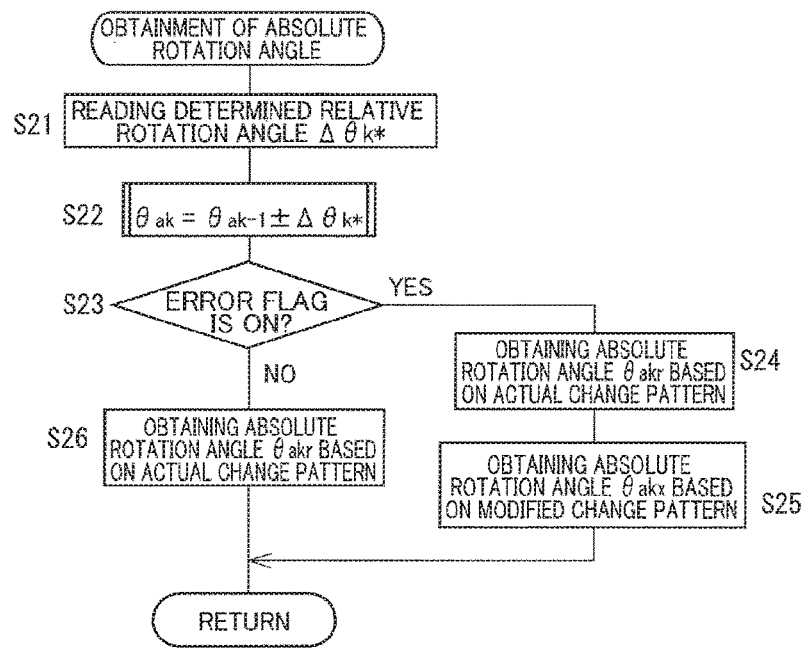
FIG. 10 is a flowchart representing an absolute-rotation-angle obtaining program stored in the storage of the motor ECU.

The absolute rotation angle $\theta_{ak}$ is obtained according to an absolute-rotation-angle obtaining program represented by the flowchart in FIG. 10. The motor ECU 112 at S21 reads the magnitude $\Delta\theta_{k*}$ and the orientation of the determined relative rotation angle. The motor ECU 112 at S22 obtains the absolute rotation angle $\theta_{ak}$ by calculating the determined relative rotation angle $\Delta\theta_{k*}$ with consideration of the orientation of the determined relative rotation angle. It is noted that processings at S23 and subsequent steps will be described later.

Figure 5C:
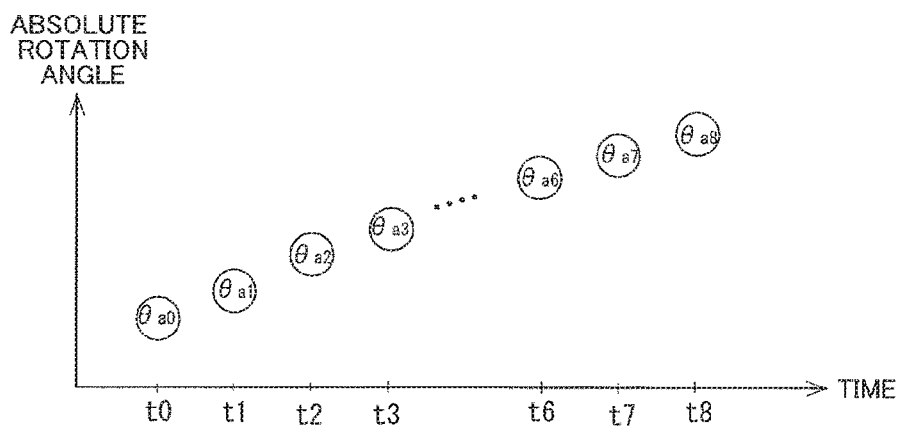
FIG. 5C is a view illustrating changes in absolute rotation angles obtained by calculating the relative rotation angles.

For example, FIG. 5B illustrates the recognized values $\theta_{tk}$ in the case where the electric motor 48 is being rotated in the forward direction. The resolver 144 outputs the output value $\theta_{tk}$ at intervals of the cycle time. That is, the resolver 144 outputs the output values $\theta_{tk}$ at times t0, t1, t2, and so on. The motor ECU 112 receives and recognizes these output values $\theta_{tk}$. In this case, the motor ECU 112 sets the raw relative rotation angle $\Delta\theta_k$ to the determined relative rotation angle $\Delta\theta_{k*}$ at cycle times t1-t6 (S5). While the raw relative rotation angle $\Delta\theta_7$ is a negative value at cycle time t7, the absolute value $|\Delta\theta_7|$ is greater than 180 degrees. Thus, a value obtained by subtracting the absolute value $|\Delta\theta_7|$ of the raw relative rotation angle from 360 degrees is set to the determined relative rotation angle $\Delta\theta_{k*}$ (S8). The absolute rotation angle $\theta_{ak}$ is obtained by calculating the determined relative rotation angle $\Delta\theta_{k*}$ (S22). This absolute rotation angle $\theta_{ak}$ increases monotonously as illustrated in FIG. 5C.

Figure 6B:
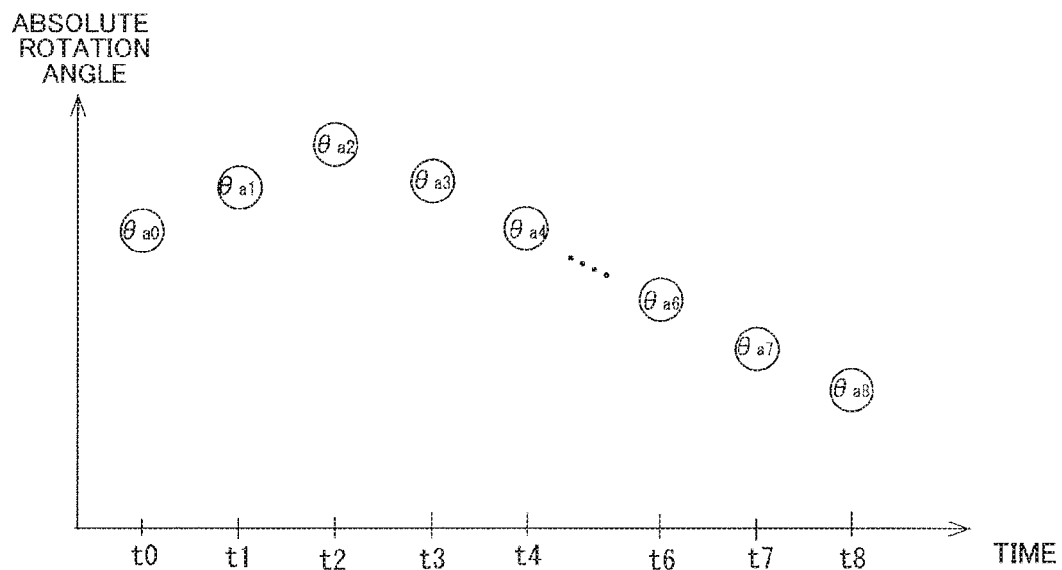
FIG. 6B is a view illustrating changes in absolute rotation angles obtained by calculating the relative rotation angles.

FIG. 6A illustrates the recognized values $\theta_{tk}$ in the case where the electric motor 48 is rotated in the reverse direction after rotated in the forward direction. At cycle time t3, the raw relative rotation angle $\Delta\theta_3$ is a negative value, and the absolute value $|\Delta\theta_3|$ is less than or equal to 180 degrees. Thus, the motor ECU 112 determines that the orientation of the determined relative rotation angle is the negative orientation, and sets the absolute value $|\Delta\theta_3|$ of the raw relative rotation angle to the determined relative rotation angle $\Delta\theta_{3*}$ (S7). At cycle time t5, the raw relative rotation angle $\Delta\theta_5$ is greater than 180 degrees. Thus, the motor ECU 112 determines that the orientation of the determined relative rotation angle is the negative orientation, and sets, to the determined relative rotation angle $\Delta\theta_{5*}$, a value obtained by subtracting the raw relative rotation angle $\Delta\theta_{k5}$ from 360 degrees. Thereafter, at each of the cycle times t6, t7, and so on, the motor ECU 112 determines that the orientation of the determined relative rotation angle is the negative orientation, and sets the absolute value $|\Delta\theta_k|$ of the raw relative rotation angle to the determined relative rotation angle $\Delta\theta_{k*}$ (S7). The absolute rotation angle $\theta_{ak}$ monotonously decreases after increasing as illustrated in FIG. 6B.

However, even in the case where the resolver 144 is normal, the recognized value is in some cases different from the value output from the resolver 144 due to communication reasons such as noise, leading to a recognition error in the motor ECU 112. Thus, the motor ECU 112 in some cases obtains an orientation different from the orientation of the relative rotation angle or obtains an angle different from the determined relative rotation angle. For example, as illustrated in FIG. 7A, it is assumed that, in the case where the electric motor 48 is being rotated in the forward direction, bit inversion is caused due to, e.g., noises, and the output value $\theta_{t3}$ of the resolver 144 at cycle time t3 is recognized by the motor ECU 112 as a value $\theta_{t3}'$ that is different from the output value $\theta_{t3}$. Since the raw relative rotation angle $\Delta\theta_3$ becomes greater than 180 degrees at cycle time t3, the motor ECU 112 determines that the orientation of the determined relative rotation angle is the negative orientation, and sets the determined relative rotation angle $\Delta\theta_{3*}$ to a value obtained by subtracting the relative rotation angle $\Delta\theta_3'$ from 360 degrees (S9). The raw relative rotation angle $\Delta\theta_4'$ at cycle time t4 is less than zero degrees, and the absolute value $|\Delta\theta_4'|$ is less than or equal to 180 degrees. Thus, the motor ECU 112 determines that the orientation of the determined relative rotation angle is the negative orientation, and sets the absolute value $|\Delta\theta_4'|$ of the raw relative rotation angle to the determined relative rotation angle $\Delta\theta_{4*}$ (S7). At cycle time t5, the raw relative rotation angle $\Delta\theta_5$ becomes less than or equal to 180 degrees. Thus, the motor ECU 112 determines that the orientation of the determined relative rotation angle is the positive orientation, and sets the determined relative rotation angle $\Delta\theta_{5*}$ to the raw relative rotation angle $\Delta\theta_5$ (S5).

Figure 7B:
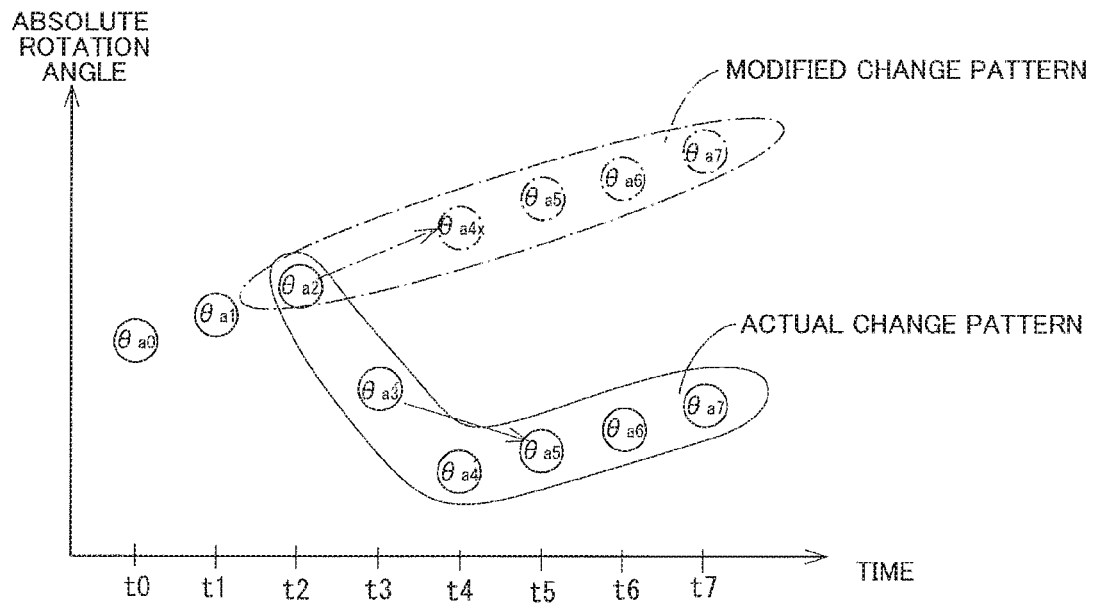
FIG. 7B is a view illustrating changes in the absolute rotation angles obtained by calculating the relative rotation angles and changes in modified absolute rotation angles.

Normally, as illustrated in FIG. 7B, the absolute rotation angle $\theta_{ak}$ increases monotonously as indicated by the one-dot chain line. However, as indicated by the solid line, the absolute rotation angle $\theta_{ak}$ increases, then decreases twice successively, and then increases. Likewise, in the case where the electric motor 48 is being rotated in the reverse direction, the absolute rotation angle $\theta_{ak}$ normally decreases monotonously. However, in the event of a recognition error during rotation of the electric motor 48 in the reverse direction, it is considered that the absolute rotation angle $\theta_{ak}$ decreases, then increases twice successively, and then decreases. Thus, in the case where the obtained absolute rotation angle is greater than the actual absolute rotation angle of the the electric motor 48, the absolute rotation angle $\theta_{ak}$ is different from an actual absolute rotation angle of the electric motor 48, making it difficult to accurately obtain the position of the pressing member 46. When the electric brake 8 is released to return the pressing member 46 in the case where the absolute rotation angle $\theta_{ak}$ obtained by the motor ECU 112 is greater than the actual absolute rotation angle of the electric motor 48, the pressing member 46 is in some cases moved backward for an excessively long distance and comes into contact with a component located at a rear of the pressing member 46, which may cause a malfunction in the electric brake 8.

Figure 11:
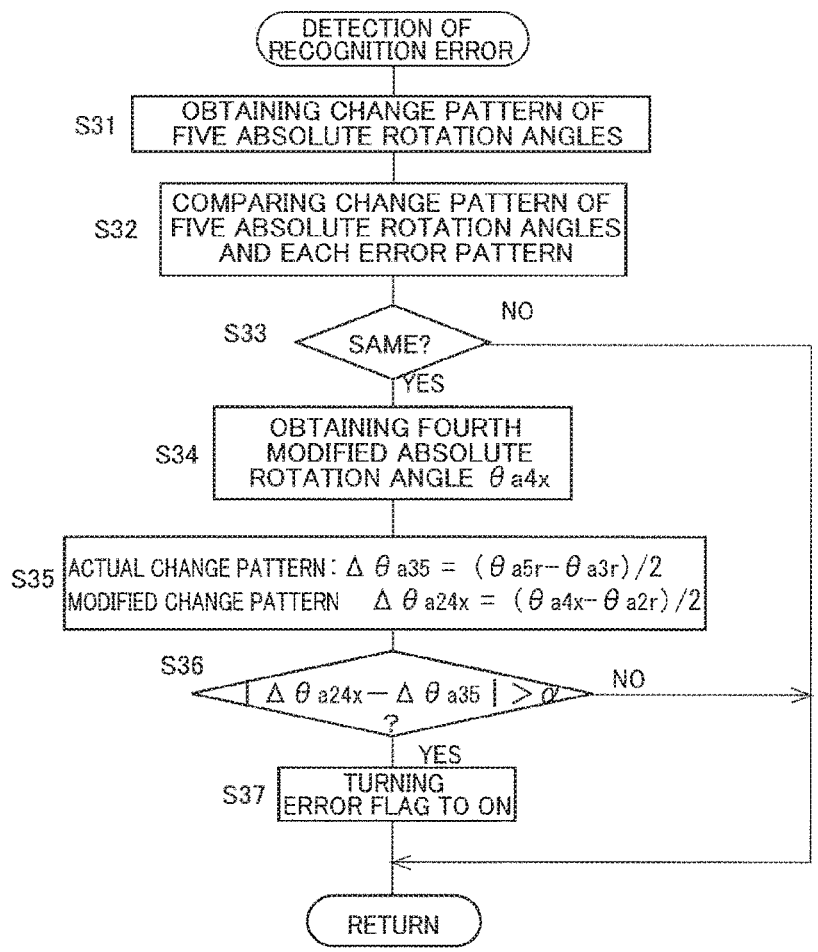
FIG. 11 is a flowchart representing a recognition-error detecting program stored in the storage of the motor ECU.

To solve this problem, in the present embodiment, the recognition error is detected by execution of a recognition-error detecting program represented by the flowchart in FIG. 11. The motor ECU 112 stores the absolute rotation angle $\theta_{ak}$ each time when the absolute rotation angle $\theta_{ak}$ is obtained. Each time when an N number of the absolute rotation angles $\theta_{ak}$ are successively stored (N is five in the present embodiment), as illustrated in FIG. 8A, a recognition error is detected based on a changing state of the stored five absolute rotation angles $\theta_{ak}$.

In the present embodiment, the recognition error is detected based on the change pattern of the absolute rotation angle and the difference in the average changed angles. As described above, it has been found that, in the case where the recognition error is caused once, the motor ECU 112 easily detects, twice successively, that the orientation of the relative rotation angle is different from the actual rotational direction of the electric motor 48. Since the absolute rotation angle is obtained by calculating the relative rotation angle, the absolute rotation angle and the changing state of the absolute rotation angles are also different respectively from those in the case where no recognition error is detected. As illustrated in, FIGS. 5C and 6B, it has been also found that, in the case where no recognition error is detected, the absolute rotation angle changes at substantially the same rate because the rotational speed of the electric motor 48 is rarely changed sharply for a considerably short period.

In view of the above, in the present embodiment, the motor ECU 112 detects that there is a high possibility of the recognition error, in the case of a first error pattern or a second error pattern. The first error pattern is a pattern in which, among five absolute rotation angles, the orientation of change is the same between the first absolute rotation angle $\theta_{a1}$ and the second absolute rotation angle $\theta_{a2}$ and between the fourth absolute rotation angle $\theta_{a4}$ and the fifth absolute rotation angle $\theta_{a5}$, and the rate of the change is substantially the same between the first absolute rotation angle $\theta_{a1}$ and the second absolute rotation angle $\theta_{a2}$ and between the fourth absolute rotation angle $\theta_{a4}$ and the fifth absolute rotation angle $\theta_{a5}$, but the orientation of change between the second absolute rotation angle $\theta_{a2}$ and the third absolute rotation angle $\theta_{a3}$ and the orientation of change between the third absolute rotation angle $\theta_{a3}$ and the fourth absolute rotation angle $\theta_{a4}$ are different from the orientation of the change between the first absolute rotation angle $\theta_{a1}$ and the second absolute rotation angle $\theta_{a2}$ and between the fourth absolute rotation angle $\theta_{a4}$ and the fifth absolute rotation angle $\theta_{a5}$. In other words, the first error pattern is a pattern in which, among five successive absolute rotation angles, the second absolute rotation angle $\theta_{a2}$ is greater than the first absolute rotation angle $\theta_{a1}$, and the second absolute rotation angle $\theta_{a2}$ is greater than the third absolute rotation angle $\theta_{a3}$, and the third absolute rotation angle $\theta_{a3}$ is greater than the fourth absolute rotation angle $\theta_{a4}$, and the fifth absolute rotation angle $\theta_{a5}$ is greater than the fourth absolute rotation angle $\theta_{a4}$, and the rate of the change between the first absolute rotation angle $\theta_{a1}$ and the second absolute rotation angle $\theta_{a2}$ and the rate of the change between the fourth absolute rotation angle $\theta_{a4}$ and the fifth absolute rotation angle $\theta_{a5}$ are substantially equal to each other. The second error pattern is a pattern in which the second absolute rotation angle $\theta_{a2}$ is less than the first absolute rotation angle $\theta_{a1}$, and the second absolute rotation angle $\theta_{a2}$ is less than the third absolute rotation angle $\theta_{a3}$, and the third absolute rotation angle $\theta_{a3}$ is less than the fourth absolute rotation angle $\theta_{a4}$, and the fifth absolute rotation angle $\theta_{a5}$ is less than the fourth absolute rotation angle $\theta_{a4}$, and the rate of the change between the first absolute rotation angle $\theta_{a1}$ and the second absolute rotation angle $\theta_{a2}$ and the rate of the change between the fourth absolute rotation angle $\theta_{a4}$ and the fifth absolute rotation angle $\theta_{a5}$ are substantially equal to each other.

In the present embodiment, the first error pattern illustrated in FIG. 8A ($\theta_{a1}$, $\theta_{a2}$, $\theta_{a3}$, $\theta_{a4}$, $\theta_{a5}$) and the second error pattern illustrated in FIG. 8C are stored in the storage of the motor ECU 112 in advance. In the case where the actual change pattern of the five absolute rotation angles $\theta_{ak}$ is the same as any one of the first error pattern and the second error pattern, the motor ECU 112 determines that there is a high possibility that the third absolute rotation angle $\theta_{a3}$ and the fourth absolute rotation angle $\theta_{a4}$ are obtained based on values with recognition error.

As illustrated in FIG. 7B, among the five absolute rotation angle ($\theta_{a1}$, $\theta_{a2}$, $\theta_{a3}$, $\theta_{a4}$, $\theta_{a5}$), an absolute value of a difference between (i) an average changed angle $\{\theta_{a35} = (\theta_{a5} - \theta_{n3})/2\}$ between the third absolute rotation angle $\theta_{a3}$ and the fifth absolute rotation angle $\theta_{a5}$ and (ii) an average changed angle $\{\Delta\theta_{a24x} = (\theta_{a4x} - \theta_{a2})/2\}$ between the second value $\theta_{a2}$ and a modified absolute rotation angle $\theta_{a4x}$ that is a fourth absolute rotation angle obtained by excluding (neglecting) the third value $\theta_{a3}$ (indicated by the value $\theta_{a3}'$ in FIG. 7B) is greater than a threshold value $\alpha$ as a first threshold value. The third and fourth absolute rotation angles $\theta_{a3}$, $\theta_{a4}$ are values obtained based on values with recognition error. Thus, the orientation of change between the third absolute rotation angle $\theta_{a3}$ and the fourth absolute rotation angle $\theta_{a4}$ is reverse to the orientation of change between the fourth absolute rotation angle $\theta_{a4}$ and the fifth absolute rotation angle $\theta_{a5}$. Thus, the absolute value of a difference between (i) the average changed angle between the third absolute rotation angle $\theta_{a3}$ and the fifth absolute rotation angle $\theta_{a5}$ and (ii) the average changed angle in the case where no recognition error is detected (i.e., the average changed angle between the second absolute rotation angle $\theta_{a2}$ and the fourth modified absolute rotation angle $\theta_{a4x}$) is greater than the threshold value $\alpha$. The threshold value $\alpha$ is set to such a value that enables the motor ECU 112 to determine that the recognition error has occurred, when obtaining the third absolute rotation angle $\theta_{a3}$.

It is noted that the fourth modified absolute rotation angle $\theta_{a4x}$ obtained by excluding the third absolute rotation angle $\theta_{a3}$ is obtained by adding, to the second absolute rotation angle $\theta_{a2}$, a relative rotation angle $\Delta\theta_{24}$ of the electric motor 48 for two cycle times (a set time×2) determined based on a value obtained by subtracting a value $\theta_{t2}$ which is a second value supplied from the resolver 144, from a value $\theta_{t4}$ which is a fourth value supplied from the resolver 144. The fourth modified absolute rotation angle $\theta_{a4x}$ is obtainable according to the following equation using an actual absolute rotation angle $\theta_{a4r}$ that is a fourth absolute rotation angle obtained without neglecting the third absolute rotation angle $\theta_{a3}$: $\theta_{a4x} = \theta_{a4r} \pm 360°$. In the case where the electric motor 48 is being rotated in the forward direction, +360 degrees are employed. In the case where the electric motor 48 is being rotated in the reverse direction, −360 degrees are employed. In the following description, each absolute rotation angle partly constituting the actual change pattern may be referred to as "actual absolute rotation angle" in contrast to the modified absolute rotation angle. The actual change pattern is the same as the error pattern in some cases and is not the same as the error pattern in other cases.

At S31 in the flowchart in FIG. 11, the motor ECU 112 obtains an actual change pattern based on the five absolute rotation angles $\theta_{ak}$. The motor ECU 112 at S32 compares the actual change pattern and each of the first and second error patterns with each other. The motor ECU 112 at S33 determines whether the actual change pattern and any of the first and second error patterns are the same as each other. When a negative decision (NO) is made at S33, the motor ECU 112 detects no recognition error and does not execute processings at S34 and subsequent steps. For example, the change pattern of the five absolute rotation angles $\theta_{ak}$ at cycle times t0-t4 in FIG. 8A is different from each of the first and second error patterns, but the change pattern of the five absolute rotation angles $\theta_{ak}$ at cycle times t1-t5 is the same as the first error pattern.

When a positive decision (YES) is made at S33, the motor ECU 112 at S34 obtains the fourth modified absolute rotation angle $\theta_{a4x}$ of the five absolute rotation angles $\theta_{ak}$. The motor ECU 112 at S35 obtains (i) an average changed angle $\Delta\theta_{a35}$ between the third actual absolute rotation angle $\theta_{a3r}$ and the fifth actual absolute rotation angle $\theta_{a5r}$ and (ii) an average changed angle $\Delta\theta_{a24x}$ between the second actual absolute rotation angle $\theta_{a2r}$ and the fourth modified absolute rotation angle $\theta_{a4x}$. The motor ECU 112 at S36 determines whether the absolute value of a difference between the average changed angle $\Delta\theta_{a35}$ and the average changed angle $\Delta\theta_{a24x}$ is greater than the threshold value $\alpha$. When the absolute value of the difference is greater than the threshold value $\alpha$, the motor ECU 112 determines that the recognition error has occurred in the value $\theta_{t3}$ which is a third value supplied from the resolver 144 and received by the motor ECU 112, in other words, the motor ECU 112 determines that the third absolute rotation angle $\theta_{a3}$ and the fourth absolute rotation angle $\theta_{a4}$ are obtained based on values with recognition error. Thus, the motor ECU 112 at S37 turns the error flag to ON.

In the present embodiment, as described above, the recognition error is detected based on the change pattern of the absolute rotation angle and the difference in the average changed angles. The resolver 144 analyzes the rotation angle with high accuracy. This makes it difficult to detect the recognition error based on a relationship between the position of the pressing member 46 which corresponds to the absolute rotation angle determined based on the relative rotation angle, and the axial force detected by the axial-force sensor 146. Changes in a depressing force applied from the driver to the brake pedal 20 can rotate the electric motor 48 in the forward direction and the reverse direction, making it difficult to detect the recognition error based on simple increase and decrease in the absolute rotation angle. In the present embodiment, in contrast, the recognition error is detected based on the change pattern of the absolute rotation angle and the difference in the average changed angles, making it possible to detect the recognition error with high accuracy.

There will be next described control of the electric brakes in the present vehicle brake system. When the brake switch 140 is turned to ON by depression of the brake pedal 20, the pressing force is controlled. An operation state of the brake pedal 20 (hereinafter may be referred to as "braking operation state") is obtained based on at least one of a value detected by the stroke sensor 130 and values detected by the respective master-cylinder-pressure sensors 132, 134. The brake ECU 110 calculates a total requested pressing force based on the braking operation state. The total requested pressing force is a pressing force requested by the driver. The brake ECU 110 calculates a target hydraulic pressure and a target axial force based on the total requested pressing force. The target hydraulic pressure is a target pressing force for each of the hydraulic brakes 4L, 4R. The target axial force is a target pressing force for each of the electric brakes 8L, 8R. The brake ECU 110 calculates a target position that is a position of the pressing member 46 which is related to the target axial force. The position of the pressing member 46, for example, may be defined as a position of a predetermined portion (e.g., a distal end portion) of the pressing member 46.

The brake ECU 110 closes the master cut-off valves 24, 26, controls the hydraulic-pressure control unit 10, and outputs the target axial force and the target position to each of the motor ECUs 112L, 112R. Each of the motor ECUs 112L, 112R controls a current to be supplied to the electric motor 48, such that an actual axial force applied to the pressing member 46 and an actual position of the pressing member 46 are brought closer respectively to the target axial force and the target position. It is noted that control for hydraulic pressures in the respective hydraulic brakes 4FL, 4FR does not relate to the present disclosure, and an explanation thereof is omitted.

Figure 12:
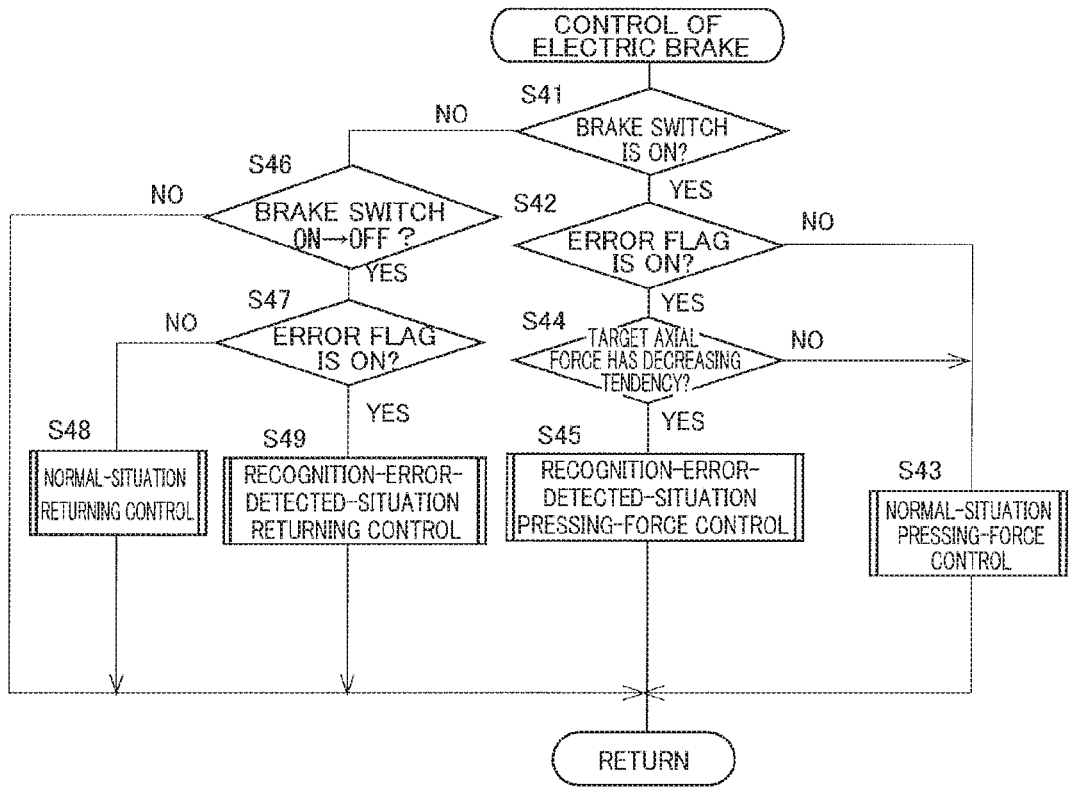
FIG. 12 is a flowchart representing an electric-motor controlling program stored in the storage of the motor ECU.

Control for the electric brakes 8RL, 8RR is executed by execution of an electric-brake controlling program represented by the flowchart in FIG. 12. The electric-brake controlling program is executed each time when a set length of time is elapsed. It is determined at S41 whether the brake switch 140 is ON and determined at S42 whether the error flag is ON. When a positive decision (YES) is made at S41, and a negative decision (NO) is made at S42, a normal-situation pressing-force control is executed at S43. In this specification, the normal situation means a situation in which the recognition error is not detected.

In the normal-situation pressing-force control, a current determined based on deviation between the target axial force and the actual axial force detected by the axial-force sensor 146 and on deviation between the target position and the actual position of the pressing member 46 which is determined based on the absolute rotation angle (the actual absolute rotation angle) $\theta_{ak}$ is supplied to the electric motor 48. Feedback control relating to the axial force and the position is executed for the current to be supplied to the electric motor 48. It is noted that only the feedback control relating to the axial force may be executed for the current to be supplied to the electric motor 48 in the normal-situation pressing-force control. Alternatively, the present electric-brake controller may be configured such that the feedback control relating to the axial force is executed when the target axial force is greater than a set axial force, and the feedback control relating to the position is executed when the target axial force is less than or equal to the set axial force, for example.

When positive decisions (YES) are made at S41 and S42, it is determined at S44 whether the target axial force has a decreasing tendency. When a negative decision (NO) is made at S44, the normal-situation pressing-force control is executed at S43 as described above. This is because there is no possibility of problems caused during backward movement of the pressing member 46 due to low positional accuracy in the case where the target axial force has an increasing tendency, and the pressing member 46 is advanced. There is no possibility of such problems also in the case where the target axial force is held. When a positive decision (YES) is made at S44, in other words, when the target axial force has a decreasing tendency; a recognition-error-detected-situation pressing-force control is executed at S45.

Feedback control relating to the axial force and the position is executed for the current to be supplied to the electric motor 48 also in the recognition-error-detected-situation pressing-force control. In this feedback control, a position located at a rear of (i) a first position (a modified-change-pattern-dependent determined position) that is a position of the pressing member 46 determined by the absolute rotation angle based on a modified change pattern and (ii) a second position (an actual-change-pattern-dependent determined position) that is a position of the pressing member 46 determined by the absolute rotation angle based on the actual change pattern is fed back as the actual position. In other words, a position of the pressing member 46 which is determined based on a smaller one of an absolute rotation angle obtained based on the modified change pattern (a modified absolute rotation angle $\theta_{akx}$) and an absolute rotation angle obtained based on the actual change pattern (an actual absolute rotation angle $\theta_{akr}$) is fed back as the actual position. Thus, since the position located at a rear of the first position and the second position is fed back as the actual position, it is possible to prevent excessive backward movement of the pressing member 46.

The modified change pattern is a change pattern of the absolute rotation angle in the case where it is assumed that no recognition error is caused. For example, the modified change pattern is a change pattern indicated by the one-dot chain line in FIG. 7B and obtained by modifying the actual change pattern. Specifically, the modified change pattern is a change pattern including the fourth modified absolute rotation angle $\theta_{a4x}$ and not including the third actual absolute rotation angle $\theta_{a3r}$ and the fourth actual absolute rotation angle $\theta_{a4r}$. Each of the absolute rotation angle $\theta_{akx}$ based on the modified change pattern, and the modified absolute rotation angle $\theta_{akx}$ refers to the fourth modified absolute rotation angle $\theta_{a4x}$ partly constituting the modified change pattern and to an absolute rotation angle $\theta_{akx}$ obtained by adding the determined relative rotation angle $\Delta\theta_{k*}$ with respect to the fourth modified absolute rotation angle $\theta_{a4x}$.

The actual change pattern is a change pattern of the absolute rotation angle which is obtained at S22. In the case where the recognition error is detected, the actual change pattern is a change pattern indicated by the solid line in FIG. 7B and including absolute rotation angles obtained based on values with recognition error. The absolute rotation angle based on the actual change pattern is the actual absolute rotation angle $\theta_{akr}$ that is each absolute rotation angle partly constituting the actual change pattern as described above. Examples of the actual absolute rotation angle $\theta_{akr}$ include: the third and fourth actual absolute rotation angles $\theta_{a3r}$, $\theta_{a4r}$ obtained based on values with recognition error in the case where the recognition error is detected; and absolute rotation angles obtained by calculating the determined relative rotation angle $\Delta\theta_{k*}$ with respect to the fourth actual absolute rotation angle in the case where the recognition error is detected.

In the case where the recognition error is detected, and the error flag is ON, a positive decision (YES) is made at S23 in the absolute-rotation-angle obtaining program represented by the flowchart in FIG. 10. The motor ECU 112 at S24 obtains the absolute rotation angle $\theta_{akr}$ based on the actual change pattern and at S25 obtains the absolute rotation angle $\theta_{akx}$ based on the modified change pattern. In the case where the error flag is OFF, the motor ECU 112 at S26 obtains the absolute rotation angle $\theta_{akr}$ based on the actual change pattern.

Figure 14:
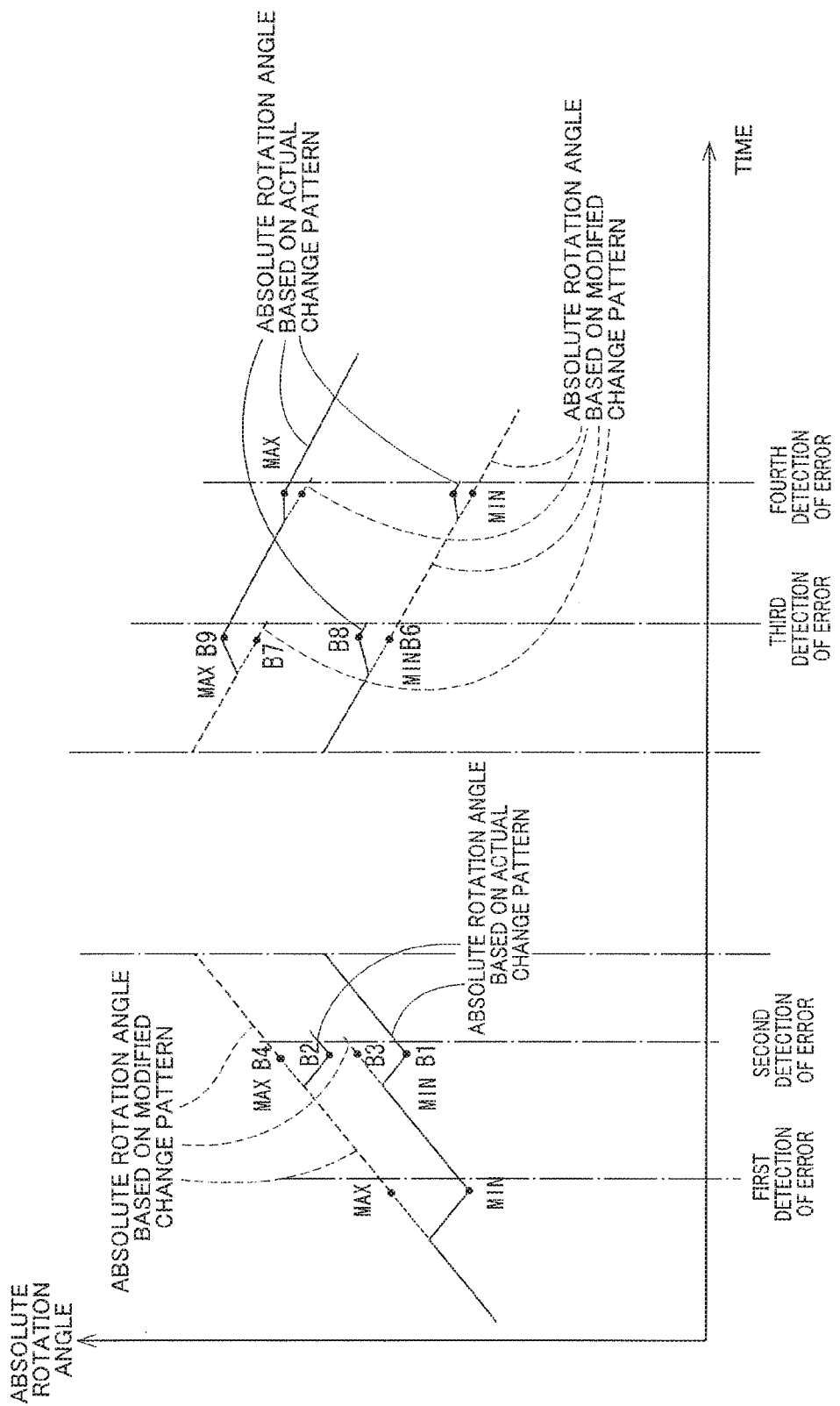
FIG. 14 is a view of changes in absolute rotation angles based on a modified change pattern and changes in absolute rotation angles based on an actual change pattern.

It is noted that, while the flowchart in FIG. 10 represents obtainment of the absolute rotation angle in the case where the recognition error is detected once, the recognition error is in some cases detected a plurality of times during one operation of the electric brake 8. In this case, as illustrated in FIG. 14, the actual absolute rotation angle and the modified absolute rotation angle are obtained for each of the absolute rotation angle based on the modified change pattern and the absolute rotation angle based on the actual change pattern. The largest value and the smallest value are selected from among the obtained actual absolute rotation angles and the modified absolute rotation angles, and thereafter the absolute rotation angles are rotated based on a change pattern containing the largest value and a change pattern containing the smallest value. For example, in the case of the second detection of the recognition error, an actual absolute rotation angle B1 and a modified absolute rotation angle B3 are obtained for the absolute rotation angle based on the actual change pattern indicated by the solid line, an actual absolute rotation angle B2 and a modified absolute rotation angle B4 are obtained for the absolute rotation angle based on the modified change pattern indicated by the broken line, and the modified absolute rotation angle B4 as the largest value among the obtained values and the actual absolute rotation angle B1 as the smallest value among the obtained values are selected. Thereafter, the absolute rotation angle based on the modified change pattern with respect to the selected modified absolute rotation angle B4 and the absolute rotation angle based on the actual change pattern with respect to the selected actual absolute rotation angle B1 are obtained. In the case of the third detection of the recognition error, modified absolute rotation angles B6, B7 and actual absolute rotation angles B8, B9 are compared with each other, and the actual absolute rotation angle B9 as the largest value and the modified absolute rotation angle B6 as the smallest value are selected. Thus, even in the case where the recognition error is detected for a plurality of times, it is considered that one of the selected two change patterns serves as the actual change pattern, and the other serves as the modified change pattern. The reference value (the fourth actual absolute rotation angle $\theta_{a4r}$) of the absolute rotation angle based on the actual change pattern and the reference value (the fourth modified absolute rotation angle $\theta_{a4x}$) of the absolute rotation angle based on the modified change pattern are determined each time when the recognition error is detected.

In the case where the brake switch 140 is turned to OFF, that is, in the case where the brake switch 140 is switched from ON to OFF, the pressing member 46 is returned to its initial position. The initial position is a position at which the absolute rotation angle is zero, in other words, a position determined based on the absolute rotation angle is zero (a position at which an amount of advance of the pressing member 46 is zero).

When a negative decision (NO) is made at S41 in the flowchart in FIG. 12, it is determined at S46 whether the brake switch 140 is ON at the previous operation. That is, it is determined whether the brake switch 140 is switched from ON to OFF at this time. When a positive decision (YES) is made at S46, it is determined at S47 whether the error flag is ON. When a negative decision (NO) is made at S47, normal-situation returning control is executed at S48.

In the normal-situation returning control, the electric motor 48 is controlled to return the pressing member 46 at a preset speed until the actual absolute rotation angle $\theta_{ak}$ at the time when the brake switch 140 switched from ON to OFF becomes zero. In the case where no recognition error is detected, it is possible to return the pressing member 46 to the same initial position at each time by moving the pressing member 46 backward by an amount equal to that of advance corresponding to the actual absolute rotation angle, in other words, by moving the pressing member 46 backward until the absolute rotation angle becomes zero.

When a positive decision (YES) is made at S47, recognition-error-detected-situation returning control is executed at S49. In the recognition-error-detected-situation returning control, the electric motor 48 is controlled to return the pressing member 46 until a smaller one of the absolute rotation angle $\theta_{akr}$ based on the actual change pattern and the absolute rotation angle $\theta_{akx}$ based on the modified change pattern at the time when the brake switch 140 is switched from ON to OFF becomes zero, that is, until the position located at a rear of the first position and the second position becomes zero (the position at which an amount of advance of the pressing member 46 is zero). In the recognition-error-detected-situation returning control, the pressing member 46 is returned more slowly than in the normal-situation returning control. In other words, the pressing member 46 is returned in the recognition-error-detected-situation returning control at a speed that is less than the set speed in the normal-situation returning control.

This control reduces an amount of backward movement of the pressing member 46 to the initial position, thereby well avoiding excessive backward movement. Also, the control makes it difficult for the pressing member 46 to come into contact with a component disposed at a rear of the pressing member 46 even without a stopper provided in the electric brake 8. Furthermore, the pressing member 46 is moved backward slowly. Thus, if the pressing member 46 comes into contact with the component located at a rear of the pressing member 46, it is difficult to cause a malfunction in the electric brake 8.

Figure 13:
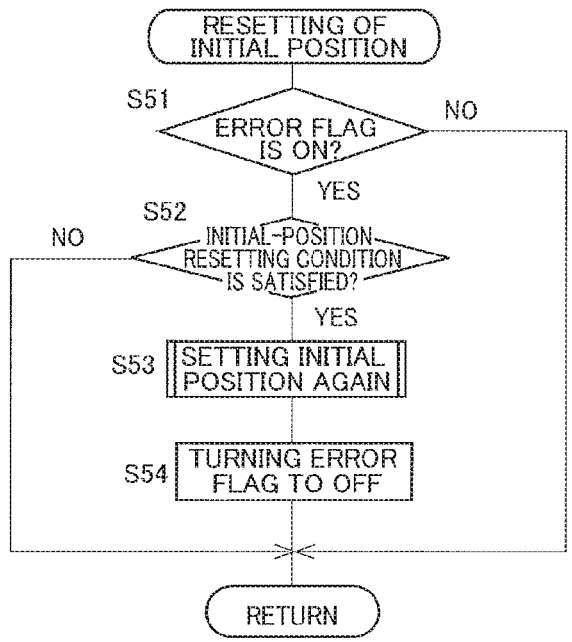
FIG. 13 is a flowchart representing an initial-position resetting program stored in the storage of the motor ECU.

In the present embodiment, in the case where the recognition error is detected, the brake switch 140 is turned to OFF, and when a predetermined initial-position resetting condition is satisfied, the initial position is set again, in other words, the initial position is reset. This resetting of the initial position is executed by execution of an initial-position resetting program represented by the flowchart in FIG. 13.

It is determined at S51 whether the error flag is ON. It is determined at S52 whether the initial-position resetting condition is satisfied. For example, it is determined whether at least one of (i) a condition that the accelerator switch 143 becomes ON, (ii) a condition that a set length of time has elapsed from the time when the brake switch 140 is turned to OFF, and (iii) a condition that the vehicle is at rest, and the shift position detected by the shift-position sensor 142 is a parking position is satisfied. When the initial-position resetting condition is satisfied, the initial position is set again at S53. In this processing, the pressing member 46 is advanced until the pressing member 46 comes into contact with the friction pad 32 slightly, and thereafter the pressing member 46 is moved backward by a set value. The set value is determined to have a magnitude that reduces delay in response of the brake and does not cause brake drag. At S54, the error flag is turned to OFF.

Thus, in the case where the recognition error is detected, the initial position of the pressing member 46 is set again. This processing avoids brake drag and makes it difficult to cause delay in brake response.

In the above-described embodiment, the resolver 144 is one example of a rotation-angle sensor, and the motor ECU 112 is one example of a data processor. A relative-rotation-angle obtaining unit is constituted by portions of the motor ECU 112 which store and execute the relative-rotation-angle obtaining program in FIG. 9, for example. An absolute-rotation-angle obtaining unit is constituted by portions of the motor ECU 112 which store and execute the absolute-rotation-angle obtaining program in FIG. 10. A second absolute-rotation-angle obtaining unit is constituted by portions of the absolute-rotation-angle obtaining unit which store and execute the processings at S24 and S26, for example. A first absolute-rotation-angle obtaining unit is constituted by portions of the absolute-rotation-angle obtaining unit which store and execute the processing at S25, for example. A rotation angle obtainer is constituted by the relative-rotation-angle obtaining unit and the absolute-rotation-angle obtaining unit, for example. A recognition-error detector is constituted by portions of the motor ECU 112 which store and execute the recognition-error detecting program in FIG. 11.

A motor controller is constituted by portions of the motor ECU 112 which store and execute the electric-brake controlling program represented by the flowchart in FIG. 12, for example. Portions of the motor controller which store and execute the processings at S41-S45 constitute a pressing-force controller and a feedback controller, for example. A recognition-error-detected-situation pressing-force controller is constituted by portions of the motor controller which store and execute the processing at S45, for example. A recognition-error-detected-situation returner is constituted by portions of the motor controller which store and execute the processing at S49, for example. A recognition-error-detected-situation motor controller is constituted by the recognition-error-detected-situation pressing-force controller and the recognition-error-detected-situation returner, for example. An initial-position re-setter is constituted by portions of the motor ECU 112 which store and execute the initial-position resetting program represented by the flowchart in FIG. 13, for example.

It is not essential to execute both the processings at S31-S33 and the processings at S34-S36 in the flowchart in FIG. 11. For example, the recognition error is detectable based on at least one of the change pattern and the amount of change in the absolute rotation angle.

The recognition error is detected based on the absolute rotation angle $\theta_{ak}$ but may be detected based on any of the orientation of the determined relative rotation angle $\Delta\theta_{k*}$, a changing state of the orientation of the determined relative rotation angle $\Delta\theta_{k*}$, the value $\theta_{tk}$ supplied from the resolver 144 and recognized by the motor ECU 112, and the changing state of the value $\theta_{tk}$, for example. In the case where the determined relative rotation angle $\Delta\theta_{k*}$ has a value with a sign (positive or negative), the recognition error may be detected based on the determined relative rotation angle $\Delta\theta_{k*}$ and the changing state of the determined relative rotation angle $\Delta\theta_{k*}$.

In the case where the target axial force decreases, the normal-situation pressing-force control may be executed at S45. This is because there is a low possibility that the pressing member 46 is moved backward for an excessively long distance in execution of the processing at S45 when compared with execution of the processing at S49.

The present vehicle brake system may be configured such that it is determined at each of S42 and S47 whether a difference between the absolute rotation angle $\theta_{akr}$ based on the actual change pattern and the absolute rotation angle $\theta_{akx}$ based on the modified change pattern at the time of the processing is greater than or equal to the set value or whether the number of detections of the recognition error is greater than the set number of times, and when a positive decision (YES) is made in this processing, a corresponding one of the processings at S45 and S49 is executed. The vehicle brake system may be configured such that it is determined at S51 whether the number of detections of the recognition error is greater than the set number of times, and when a positive decision (YES) is made in this processing, the processing at S53 is executed.

Figure 15:
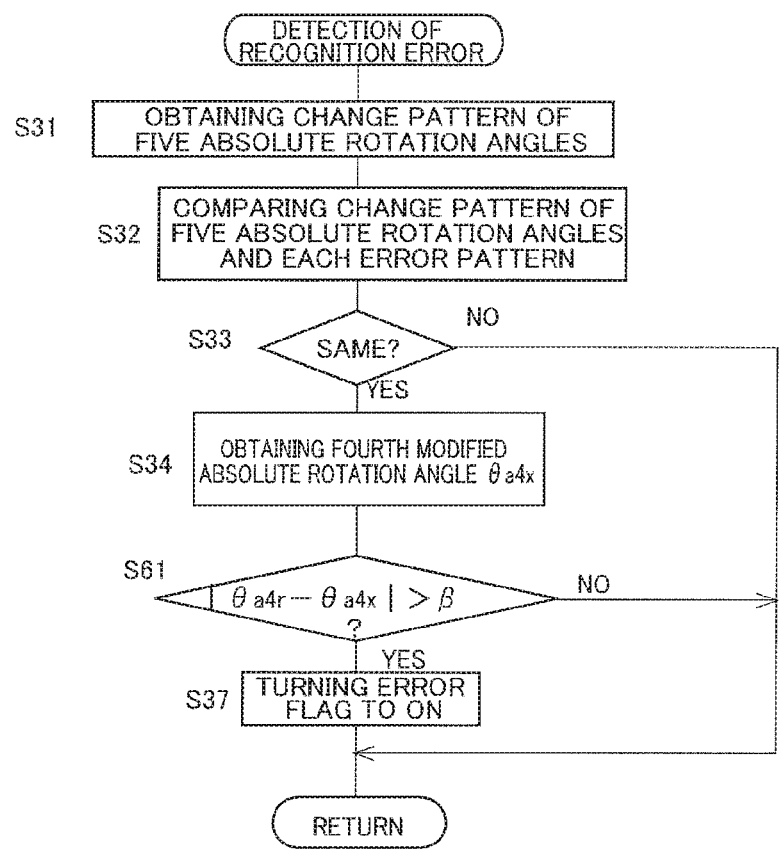
FIG. 15 is a flowchart representing another recognition-error detecting program stored in the storage of the motor ECU.

The recognition error may be detected by executing a recognition-error detecting program represented by the flowchart in FIG. 15. It is noted that the same step numbers as used in the flow chart in FIG. 11 in the above-described embodiment are used to designate the corresponding step numbers in the flowchart in FIG. 15, and an explanation of which is dispensed with. In the present embodiment, it is determined at S61 whether the absolute value of a difference between the fourth modified absolute rotation angle $\theta_{a4x}$ obtained at S34 and the actual absolute rotation angle $\theta_{a4r}$ is greater than a threshold value β as one example of a second threshold value. When a positive decision (YES) is made at S61, the recognition error is detected. It is possible to consider that the determination at S61 corresponds to determination of whether the absolute value of the difference between (i) the rate of change between the second actual absolute rotation angle $\theta_{a2r}$ and the fourth actual absolute rotation angle $\theta_{a4r}$ and (ii) the rate of change between the second actual absolute rotation angle $\theta_{a2r}$ and the fourth modified absolute rotation angle $\theta_{a4x}$ is greater than the threshold value. The recognition error may be detected when a positive decision (YES) is made at S36 in FIG. 11, and a positive decision (YES) is made at S61.

Figure 16:
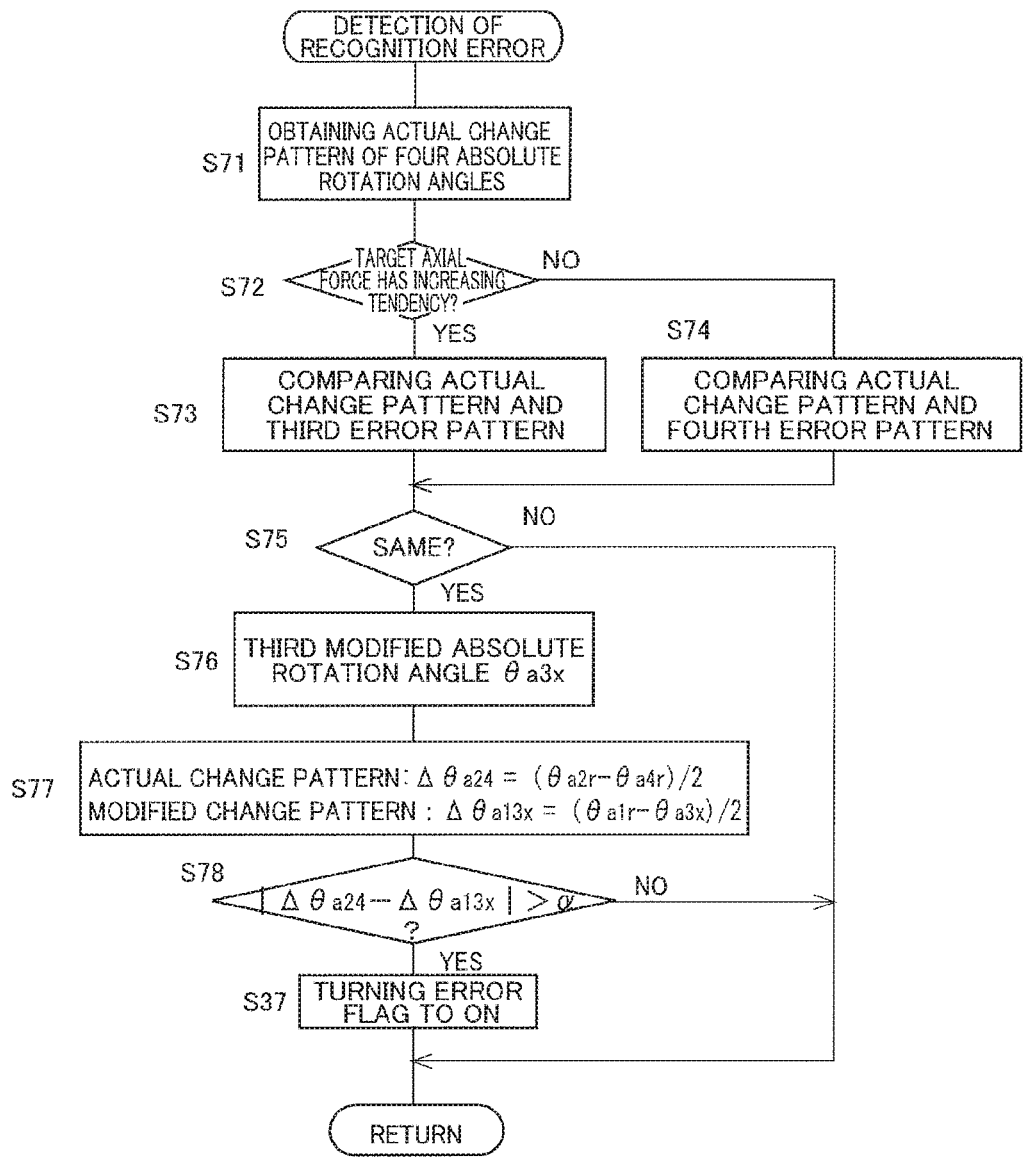
FIG. 16 is a flowchart representing yet another recognition-error detecting program stored in the storage of the motor ECU.

The recognition error may be detected by execution of a recognition-error detecting program represented by the flowchart in FIG. 16. In the present embodiment, N is set to four, and the change pattern of four absolute rotation angles $\theta_{ak}$ is obtained in detection of the recognition error. In the present embodiment, the recognition error is detected in the case where the target axial force has an increasing tendency (that is the electric motor 48 is being rotated in the forward direction), and the change pattern is the same as a third error pattern illustrated in FIG. 8D or in the case where the target axial force has a decreasing tendency (that is the electric motor 48 is being rotated in the reverse direction), and the change pattern is the same as a fourth error pattern illustrated in FIG. 8E. The third error pattern is a pattern in which, among the four absolute rotation angles, the first absolute rotation angle $\theta_{a1}$ is greater than the second absolute rotation angle $\theta_{a2}$, and the second absolute rotation angle $\theta_{a2}$ is greater than the third absolute rotation angle $\theta_{a3}$, and the fourth absolute rotation angle $\theta_{a4}$ is greater than the third absolute rotation angle $\theta_{a3}$. The fourth error pattern is a pattern in which, among the four absolute rotation angles, the first absolute rotation angle $\theta_{a1}$ is less than the second absolute rotation angle $\theta_{a2}$, and the second absolute rotation angle $\theta_{a2}$ is less than the third absolute rotation angle $\theta_{a3}$, and the fourth absolute rotation angle $\theta_{a4}$ is less than the third absolute rotation angle $\theta_{a3}$.

According to the recognition-error detecting program represented by the flowchart in FIG. 16, an actual change pattern of four successive absolute rotation angles $\theta_{ak}$ is obtained at S71. It is determined at S72 whether the target axial force has an increasing tendency or a decreasing tendency. When the target axial force has an increasing tendency, the actual change pattern and the third error pattern are at S73 compared with each other. When the target axial force has a decreasing tendency, the actual change pattern and the fourth error pattern are at S74 compared with each other. At S75, it is determined whether the actual change pattern and the third or fourth error pattern are the same as each other.

When the actual change pattern and the third or fourth error pattern are the same as each other, the third modified absolute rotation angle $\theta_{a3x}$ is obtained at S76 by excluding the second absolute rotation angle $\theta_{a2}$. At S77, an average changed angle $\Delta\theta_{a13}$ between the first actual absolute rotation angle $\theta_{a1r}$ and the third modified absolute rotation angle $\theta_{a3x}$ and an average changed angle $\Delta\theta_{a24}$ between the second actual absolute rotation angle $\theta_{a2r}$ and the fourth actual absolute rotation angle $\theta_{a4r}$ are obtained. It is determined at S78 whether an absolute value of a difference between the average changed angle $\Delta\theta_{a13}$ and the average changed angle $\Delta\theta_{a24}$ is greater than a first threshold value α. When a positive decision (YES) is made at S78, the error flag is turned to ON at S37. Thus, even in the case where the number of the extracted absolute rotation angles is four, it is possible to accurately detect the recognition error.

The rotation sensor is not limited to the resolver. The relative rotation angle and the absolute rotation angle are obtained by the motor ECU 112 but may be obtained by a data processor principally constituted by a computer in a rotation-angle sensor including the resolver. While the embodiments and modifications have been described above, it is to be understood that the disclosure is not limited to the details of the illustrated embodiments and modifications, but may be embodied with various changes and modifications, which may occur to those skilled in the art, without departing from the spirit and scope of the disclosure.

CLAIMABLE INVENTIONS

There will be next described claimable inventions.

(1) A recognition-error detector configured to detect a recognition error in a rotation-angle obtainer configured to obtain a rotation angle of an electric motor, wherein the rotation-angle obtainer comprises an absolute-rotation-angle obtaining unit configured to: obtain a relative rotation angle based on values output and received from the rotation-angle sensor at intervals of a set length of time, the relative rotation angle being a rotation angle of the electric motor for the set length of time; and calculate the obtained relative rotation angle with consideration of an orientation of the relative rotation angle to obtain an absolute rotation angle that is a rotation angle of the electric motor from a start of operation of the electric motor, and wherein the recognition-error detector is configured to detect a recognition error in the rotation angle obtainer based on one of the absolute rotation angle and a changing state of the absolute rotation angle.

The changing state may be one or more of an orientation of change, a rate of the change, an amount of change in the rate of the change, a change pattern, and the like, for example. The changing state may be represented by any of a changed angle or an average changed angle of alternate ones of successive absolute rotation angles, and a changed angle or an average changed angle of successive absolute rotation angles, for example. It is noted that the rotation-angle obtainer may include: a relative-rotation-angle obtaining unit configured to obtain a relative rotation angle based on values output and received from a rotation-angle sensor at intervals of a set length of time, the relative rotation angle being a rotation angle of the electric motor for the set length of time; and an absolute-rotation-angle obtaining unit configured to calculate the relative rotation angle obtained by the relative-rotation-angle obtaining unit, with consideration of an orientation of the relative rotation angle to obtain an absolute rotation angle that is a rotation angle of the electric motor from a start of operation of the electric motor. The meaning of the wording "calculate the relative rotation angle obtained by the relative-rotation-angle obtaining unit, with consideration of an orientation of the relative rotation angle" is described in detail above.

(2) The recognition-error detector according to the above form (1), wherein the recognition-error detector is configured to detect the recognition error in the rotation-angle obtainer when, among at least five absolute rotation angles each as the absolute rotation angle which are obtained successively by the absolute-rotation-angle obtaining unit, the second absolute rotation angle is greater than the first absolute rotation angle, the second absolute rotation angle is greater than the third absolute rotation angle, and the third absolute rotation angle is greater than the fourth absolute rotation angle, and the fifth absolute rotation angle is greater than the fourth absolute rotation angle, or when, among at least five absolute rotation angles each as the absolute rotation angle which are obtained successively by the absolute-rotation-angle obtaining unit, the second absolute rotation angle is less than the first absolute rotation angle, and the second absolute rotation angle is less than the third absolute rotation angle, and the third absolute rotation angle is less than the fourth absolute rotation angle, and the fifth absolute rotation angle is less than the fourth absolute rotation angle.

The recognition-error detector detects the recognition error in the rotation-angle obtainer when the absolute rotation angle is changed due to two successive obtainments of the orientation of the relative rotation angle as an orientation (direction) different from the actual direction of rotation of the electric motor.

(3) The recognition-error detector according to the above form (1) or (2), wherein the recognition-error detector is configured to, when a change pattern of a set number of the absolute rotation angles obtained by the absolute-rotation-angle obtaining unit is identical to one of a plurality of error patterns set in advance, detect that at least one of the set number of the absolute rotation angles is obtained by the rotation-angle obtainer based on a value with the recognition error.

(4) The recognition-error detector according to the above form (3), wherein the plurality of error patterns comprise: a first error pattern comprising a pattern in which the absolute rotation angle increases, thereafter decreases twice successively, and thereafter increases; and a second error pattern comprising a pattern in which the absolute rotation angle decreases, increases twice successively, and thereafter decreases.

A condition that the rate of the first increase and the rate of the second increase after the successive two decreases are substantially equal to each other may be added to the first error pattern. A condition that the rate of the first decrease and the rate of the second decrease after the successive two increases are substantially equal to each other may be added to the second error pattern.

(5) The recognition-error detector according to the above form (3) or (4), wherein the absolute rotation angle is an angle that increases with rotation of the electric motor in a forward direction and decreases with rotation of the electric motor in a reverse direction, and wherein the plurality of error patterns comprise:

a third error pattern comprising a pattern in which the absolute rotation angle decreases twice successively and thereafter increases with rotation of the electric motor in the forward direction; and a fourth error pattern comprising a pattern in which the absolute rotation angle increases twice successively and thereafter decreases with rotation of the electric motor in the reverse direction.

(6) The recognition-error detector according to any one of the above forms (1) through (5), wherein the recognition-error detector is configured to detect that the second absolute rotation angle and the third absolute rotation angle are obtained by the rotation-angle obtainer based on a value with the recognition error, when, among at least four absolute rotation angles each as the absolute rotation angle which are obtained successively by the absolute-rotation-angle obtaining unit, an absolute value of a difference between (a) an average changed angle between a second absolute rotation angle and a fourth absolute rotation angle and (b) an average changed angle between a first absolute rotation angle and a modified absolute rotation angle that is a third absolute rotation angle obtained by excluding the second absolute rotation angle is greater than a first threshold value.

The first to fourth absolute rotation angles in the present form correspond respectively to the second to fifth absolute rotation angles in the case of five samples.

(7) The recognition-error detector according to any one of the above forms (1) through (5), wherein the recognition-error detector is configured to detect that the second absolute rotation angle and the third absolute rotation angle are obtained by the rotation-angle obtainer based on a value with the recognition error, when, among at least three absolute rotation angles each as the absolute rotation angle which are obtained successively by the absolute-rotation-angle obtaining unit, an absolute value of a difference between an actual absolute rotation angle as a third absolute rotation angle and a modified absolute rotation angle as a third absolute rotation angle obtained by excluding the second absolute rotation angle is greater than a second threshold value.

In the recognition-error detector according to the present form, it is possible to consider that the recognition error is detected based on the absolute rotation angle and that the recognition error is detected based on the changing state of the absolute rotation angle. This is because the third modified absolute rotation angle is calculated with respect to the first absolute rotation angle, and thus in the case where the difference between the third modified absolute rotation angle and the third actual absolute rotation angle is greater than the second threshold value, it is possible to determine that a difference between (i) the rate of the change between the first actual absolute rotation angle and the third modified absolute rotation angle and (ii) the rate of the change between the first actual absolute rotation angle and the third actual absolute rotation angle is greater than or equal to a threshold value corresponding to the second threshold value. It is noted that the first to third absolute rotation angles in the present form correspond respectively to the first to third absolute rotation angles in the case of four samples and correspond respectively to the second to fourth absolute rotation angles in the case of five samples.

(8) The recognition-error detector according to any one of the above forms (1) through (7),
wherein the rotation-angle sensor is configured to detect a rotation angle of the electric motor as a value between 0 and 360 degrees and output an output value representing the rotation angle,
wherein the rotation-angle sensor comprises a relative-rotation-angle obtaining unit configured to, in a case where an absolute value $|\Delta\theta_k|$ of a value $\Delta\theta_k$ obtained by subtracting a previous value $\theta_{tk-1}$ of the received value from a present value $\theta_{tk}$ of the received value is less than or equal to 180 degrees:
obtain that the orientation of the relative rotation angle is a positive orientation, when the obtained value $\Delta\theta_k$ is a positive value; and
obtain that the orientation of the relative rotation angle is a negative orientation, when the obtained value $\Delta\theta_k$ is a negative value, and
wherein the relative-rotation-angle obtaining unit is configured to, in a case where the absolute value $|\Delta\theta_k|$ of the obtained value $\Delta\theta_k$ is greater than 180 degrees;
obtain that the orientation of the relative rotation angle is a negative orientation, when the obtained value $\Delta\theta_k$ is a positive value; and
obtain that the orientation of the relative rotation angle is a positive orientation, when the obtained value $\Delta\theta_k$ is a negative value.

For example, the magnitude of the relative rotation angle may be obtained as the absolute value $|\Delta\theta_k|$ when the absolute value $|\Delta\theta_k|$ of the obtained value $\Delta\theta_k$ is less than or equal to 180 degrees, and may be obtained, as a value obtained by subtracting the absolute value $|\Delta\theta_k|$ from 360 degrees ($360°-|\Delta\theta_k|$) when the absolute value $|\Delta\theta_k|$ of the obtained value $\Delta\theta_k$ is greater than 180 degrees.

(9) An electric-brake controller configured to control an electric brake that is provided for a wheel of a vehicle and operable by an electric motor to reduce rotation of the wheel by pressing a pressing member via a friction member against a brake rotor rotating with the wheel,
wherein the electric-brake controller comprises:
the rotation-angle obtainer;
the recognition-error detector according to the above form (6) or (7); and
a motor controller configured to control the electric motor based on a position of the pressing member which is obtained based on the absolute rotation angle obtained by the absolute-rotation-angle obtaining unit, and
wherein the rotation-angle obtainer comprises:
a modified-absolute-rotation-angle obtaining unit configured to obtain the absolute rotation angle from the modified absolute rotation angle as the third absolute rotation angle on each time when the recognition error is detected; and
an actual-absolute-rotation-angle obtaining unit configured to obtain the absolute rotation angle from the actual absolute rotation angle as the third absolute rotation angle on.

(10) An electric-brake controller configured to control an electric brake that is provided for a wheel of a vehicle and operable by an electric motor to reduce rotation of the wheel by pressing a pressing member via a friction member against a brake rotor rotating with the wheel,
wherein the electric-brake controller comprises:
the rotation-angle obtainer;
the recognition-error detector according to any one of the above forms (1) through (8); and
a motor controller configured to control the electric motor based on a position of the pressing member which is obtained based on the absolute rotation angle obtained by the absolute-rotation-angle obtaining unit,
wherein the absolute-rotation-angle obtaining unit comprises:
a first absolute-rotation-angle obtaining unit configured to, when the recognition error is detected by the recognition-error detector, obtain the absolute rotation angle based on a modified change pattern as a change pattern comprising a modified absolute rotation angle that is one of a plurality of the absolute rotation angles which is obtained by excluding the absolute rotation angle obtained based on a value with the recognition error; and
a second absolute-rotation-angle obtaining unit configured to obtain the absolute rotation angle based an actual change pattern of the plurality of the absolute rotation angles, and
wherein the motor controller comprises a recognition-error-detected-situation motor controller configured to, when the recognition error is detected by the recognition-error detector, control the electric motor based on a position located at a rear of (i) a first position of the pressing member which is determined based on the absolute rotation angle obtained by the first absolute-rotation-angle obtaining unit, and (ii) a second position of the pressing member which is determined based on the absolute rotation angle obtained by the second absolute-rotation-angle obtaining unit.

(11) The electric-brake controller according to the above form (10), wherein the recognition-error-detected-situation motor controller comprises a recognition-error-detectedsituation returner configured to, when the electric brake is switched from an operating state to a non-operating state, move the pressing member back to an initial position thereof by controlling the electric motor based on the position located at a rear of the first position and the second position,

(12) The electric-brake controller according to the above form (11), wherein the recognition-error-detected-situation returner is configured to move the pressing member backward more slowly than when the recognition error is not detected.

It is noted that a technique of moving the pressing member slowly back to the initial position may be performed regardless of the techniques in the forms (10) and (11). In other words, when the recognition error is detected, the pressing member can be moved backward slowly regardless of a technique of moving the pressing member backward based on a smaller one of the absolute rotation angle (the modified absolute rotation angle) obtained based on the modified change pattern and the absolute rotation angle (the actual absolute rotation angle) obtained based on the actual change pattern.

(13) The electric brake controller according to any one of the above forms (10) through (12),
wherein the motor controller comprises a pressing-force controller configured to control a pressing force by controlling the electric motor based on a position of the pressing member which is determined based on the absolute rotation angle obtained by the absolute-rotation-angle obtaining unit, and the pressing force is a force by which the pressing member is pressed against the brake rotor, and
wherein the recognition-error-detected-situation motor controller comprises a recognition-error-detected-situation pressing-force controller configured to, when the recognition error is detected by the recognition-error detector, control the pressing force by controlling the electric motor based on the position located at a rear of the first position and the second position.

(14) The electric-brake controller according to the above form (13),
wherein the pressing-force controller at least comprises a feedback controller configured to control the pressing force by controlling a current supplied to the electric motor so as to bring an actual position of the pressing member closer to a target position, and
wherein the recognition-error-detected-situation pressing-force controller is configured to, when the recognition error is detected by the recognition-error detector, control the current supplied to the electric motor by feeding back the position located at a rear of the first position and the second position as the actual position.

(15) An electric-brake controller configured to control an electric brake that is provided for a wheel of a vehicle and operable by an electric motor to reduce rotation of the wheel by pressing a pressing member via a friction member against a brake rotor rotating with the wheel,
wherein the electric-brake controller comprises:
 the rotation-angle obtainer;
 the recognition-error detector according to any one of the above forms (1) through (8); and
 an initial-position re-setter configured to set an initial position of the pressing member again when the recognition error in the rotation-angle obtainer is detected by the recognition-error detector and when a predetermined resetting condition is satisfied after the electric brake becomes a non-operating state.

The resetting of the initial position is desirably executed before the next operation of the electric brake.

(16) A recognition-error detector configured to detect a recognition error in a rotation-angle obtainer configured to obtain a rotation angle of an electric motor,
wherein the rotation-angle obtainer comprises an absolute-rotation-angle obtaining unit configured to: obtain a relative rotation angle based on values output and received from the rotation-angle sensor at intervals of a set length of time, the relative rotation angle being a rotation angle of the electric motor for the set length of time; and calculate the obtained relative rotation angle to obtain an absolute rotation angle that is a rotation angle of the electric motor from a start of operation of the electric motor, and
wherein the recognition-error detector is configured to detect the recognition error based on at least one of the relative rotation angle and the absolute rotation angle or a changing state of the at least one of the relative rotation angle and the absolute rotation angle.

The technical features according to any one of the above forms (1) through (15) may be incorporated into the recognition-error detector according to the present form.

For example, in the case where four successive relative rotation angles ($\Delta\theta_2$, $\Delta\theta_3$, $\Delta\theta_4$, $\Delta\theta_5$) are obtained based on five values ($\theta_{r1}$, $\theta_{r2}$, $\theta_{r3}$, $\theta_{r4}$, $\theta_{r5}$) successively output from the rotation-angle sensor and received and recognized and in the case where the relative rotation angle with a positive orientation is represented by a positive value (+), and the relative rotation angle with a negative orientation is represented by a negative value (−), when the following three expressions are satisfied and when the value $\theta_{r3}$ is received, it is possible to determine that there is a possibility of the recognition error; $\Delta\theta_2 \times \Delta\theta_5 > 0$; $\Delta\theta_2 \times \Delta\theta_3 \leq 0$; $\Delta\theta_4 \times \Delta\theta_5 < 0$. A condition that the value $\Delta\theta_2$ is substantially equal to the value $\Delta\theta_5$ ($\Delta\theta_2 \square \Delta\theta_5$) may be added. The recognition-error detector may be configured to detect the recognition error when the orientation of the relative rotation angle has changed in a pattern (positive, negative, negative, positive) or a pattern (negative, positive, positive, negative).

In the case where relative rotation angles are obtained based on successive five values ($\theta_{r1}$, $\theta_{r2}$, $\theta_{r3}$, $\theta_{r4}$, $\theta_{r5}$) supplied from the rotation-angle sensor, and successive four absolute rotation angles $\{\theta_{a2} (= \Delta\theta_2 + \theta_{a1}), \theta_{a3}, \theta_{a4}, \theta_5\}$ are obtained, when the expression "$|(\theta_{a4} - \theta_{a2})/2 - (\theta_{a3} - \theta_{a1})/2| > y$" is satisfied, it is also possible to determine that there is a possibility of the recognition error for the value $\theta_{r3}$. The case where a difference between (i) the rate of change between two alternate values and (ii) the rate of change between two adjacent alternate values is large is one example of this case.

What is claimed is:

1. An electric-brake controller configured to control an electric brake that is provided for a wheel of a vehicle and operable by an electric motor to reduce rotation of the wheel by pressing a pressing member via a friction member against a brake rotor rotating with the wheel,
 wherein the electric-brake controller is programmed to:
  obtain a relative rotation angle based on values output and received from a rotation-angle sensor at an interval of a set length of time based on a cycle time, the relative rotation angle being a rotation angle of the electric motor for the set length of time;
  obtain an absolute rotation angle based on the obtained relative rotation angle, with consideration of an orientation of the obtained relative rotation angle, the absolute rotation angle being a rotation angle of the electric motor from a start of operation of the electric motor;

detect a recognition error in a value of the rotation angle sensor based on one of the absolute rotation angle and a changing state of the absolute rotation angle; and control the electric motor based on the detected recognition error, wherein the electric-brake controller is further programmed to, based on a change pattern as the changing state of a set number of successively obtained absolute rotation angles being identical to one of a plurality of error patterns set in advance, determine that at least one of the set number of the absolute rotation angles is obtained based on the value with the recognition error, and wherein the plurality of error patterns comprise:

a first error pattern comprising a pattern in which the absolute rotation angle increases, thereafter decreases twice successively, and thereafter increases; and a second error pattern comprising a pattern in which the absolute rotation angle decreases, increases twice successively, and thereafter decreases.

2. The electric-brake controller according to claim 1, wherein the electric-brake controller is further programmed to control the electric motor based on a position of the pressing member which is obtained based on the obtained absolute rotation angle.

3. The electric-brake controller according to claim 1, wherein the absolute rotation angle is an angle that increases with rotation of the electric motor in a forward direction and decreases with rotation of the electric motor in a reverse direction, and wherein the plurality of error patterns comprise:

a third error pattern comprising a pattern in which the absolute rotation angle decreases twice successively and thereafter increases with rotation of the electric motor in the forward direction; and a fourth error pattern comprising a pattern in which the absolute rotation angle increases twice successively and thereafter decreases with rotation of the electric motor in the reverse direction.

4. The electric-brake controller according to claim 1, wherein the electric-brake controller is further programmed to:

detect a rotation angle of the electric motor as a value between 0 and 360 degrees and output an output value representing the rotation angle, in a case where an absolute value of a value obtained by subtracting a previous value received from the rotation angle sensor from a present value received from the rotation angle sensor is less than or equal to 180 degrees:

obtain that the orientation of the relative rotation angle is a positive orientation, based on the obtained value being a positive value; and obtain that the orientation of the relative rotation angle is a negative orientation, based on the obtained value being a negative value; and in a case where the absolute value of the value received from the rotation angle sensor is greater than 180 degrees:

obtain that the orientation of the relative rotation angle is a negative orientation, based on the obtained value being a positive value; and obtain that the orientation of the relative rotation angle is a positive orientation, based on the obtained value being a negative value.

5. An electric-brake controller configured to control an electric brake that is provided for a wheel of a vehicle and operable by an electric motor to reduce rotation of the wheel by pressing a pressing member via a friction member against a brake rotor rotating with the wheel, wherein the electric-brake controller is programmed to:

obtain a relative rotation angle based on values output and received from a rotation-angle sensor at an interval of a set length of time based on a cycle time, the relative rotation angle being a rotation angle of the electric motor for the set length of time;

obtain an absolute rotation angle based on the obtained relative rotation angle, with consideration of an orientation of the obtained relative rotation angle, the absolute rotation angle being a rotation angle of the electric motor from a start of operation of the electric motor;

detect a recognition error in a value of the rotation angle sensor based on one of the absolute rotation angle and a changing state of the absolute rotation angle; and control the electric motor based on the detected recognition error, and wherein the electric-brake controller is further programmed to detect that a second absolute rotation angle and a third absolute rotation angle are obtained based on the value with the recognition error, when, among at least four successively obtained absolute rotation angles, an absolute value of a difference between (a) an average changed angle between the second absolute rotation angle and a fourth absolute rotation angle and (b) an average changed angle between a first absolute rotation angle and a modified absolute rotation angle that is the third absolute rotation angle obtained by excluding the second absolute rotation angle is greater than a first threshold value.

6. An electric-brake controller configured to control an electric brake that is provided for a wheel of a vehicle and operable by an electric motor to reduce rotation of the wheel by pressing a pressing member via a friction member against a brake rotor rotating with the wheel, wherein the electric-brake controller is programmed to:

obtain a relative rotation angle based on values output and received from a rotation-angle sensor at an interval of a set length of time based on a cycle time, the relative rotation angle being a rotation angle of the electric motor for the set length of time;

obtain an absolute rotation angle based on the obtained relative rotation angle, with consideration of an orientation of the obtained relative rotation angle, the absolute rotation angle being a rotation angle of the electric motor from a start of operation of the electric motor;

detect a recognition error in a value of the rotation angle sensor based on one of the absolute rotation angle and a changing state of the absolute rotation angle; and control the electric motor based on the detected recognition error, and wherein the electric-brake controller is further programmed to detect that a third absolute rotation angle is obtained based on the value with the recognition error, when, among at least five successively obtained absolute rotation angles, an absolute value of a difference between an actual absolute rotation angle as a fourth absolute rotation angle and a modified absolute rotation angle as the fourth absolute rotation angle obtained by excluding the third absolute rotation angle is greater than a second threshold value.

7. An electric-brake controller configured to control an electric brake that is provided for a wheel of a vehicle and operable by an electric motor to reduce rotation of the wheel by pressing a pressing member via a friction member against a brake rotor rotating with the wheel, wherein the electric-brake controller is programmed to:

obtain a relative rotation angle based on values output and received from a rotation-angle sensor at an interval of a set length of time based on a cycle time, the relative rotation angle being a rotation angle of the electric motor for the set length of time;

obtain an absolute rotation angle based on the obtained relative rotation angle, with consideration of an orientation of the obtained relative rotation angle, the absolute rotation angle being a rotation angle of the electric motor from a start of operation of the electric motor;

detect a recognition error in a value of the rotation angle sensor based on one of the absolute rotation angle and a changing state of the absolute rotation angle; and control the electric motor based on the detected recognition error, and wherein the electric-brake controller is further programmed to:

based on the recognition error being detected, obtain an absolute rotation angle based on a modified change pattern comprising a modified absolute rotation angle which is obtained by excluding, from a plurality of successively obtained absolute rotation angles, an absolute rotation angle obtained based on the value with the recognition error;

obtain an absolute rotation angle based on an actual change pattern of a plurality of successively obtained absolute rotation angles; and control the electric motor based on a position less extended toward the brake rotor of (i) a first position of the pressing member which is determined based on the absolute rotation angle based on the modified change pattern, and (ii) a second position of the pressing member which is determined based on the absolute rotation angle based on the actual change pattern.

8. The electric-brake controller according to claim 7, wherein the electric-brake controller is further programmed to, based on the electric brake being switched from an operating state to a non-operating state, move the pressing member back to an initial position thereof by controlling the electric motor based on the position less extended towards the brake rotor of the first position and the second position.

9. The electric-brake controller according to claim 8, wherein the electric-brake controller is further programmed to retract the pressing member more slowly than when the recognition error is not detected.

10. The electric-brake controller according to claim 7, wherein the electric-brake controller is further programmed to:

control a pressing force by controlling the electric motor based on a position of the pressing member which is determined based on an obtained absolute rotation angle, the pressing force being a force by which the pressing member is pressed against the brake rotor, and based on the recognition error being detected, control the pressing force by controlling the electric motor based on the position less extended towards the brake rotor of the first position and the second position.

11. The electric-brake controller according to claim 10, wherein the electric-brake controller is further programmed to:

control the pressing force by controlling the electric motor so as to bring an actual position of the pressing member closer to a target position, and based on the recognition error being detected, control the electric motor by feeding back the position less extended towards the brake rotor of the first position and the second position as the actual position.

12. The electric-brake controller according to claim 7, wherein the electric-brake controller is further configured to reset an initial position of the pressing member when the recognition error is detected and when a predetermined resetting condition is satisfied after the electric brake becomes a non-operating state.

* * * * *